United States Patent
Shukla et al.

(10) Patent No.: US 7,473,448 B2
(45) Date of Patent: Jan. 6, 2009

(54) PHOTOALIGNMENT OF LIQUID CRYSTALS USING POLY(VINYLSTILBAZOLIUM) POLYMERS

(75) Inventors: Deepak Shukla, Webster, NY (US); David M. Teegarden, Pittsford, NY (US); Thomas R. Welter, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 378 days.

(21) Appl. No.: 11/318,403

(22) Filed: Dec. 23, 2005

(65) Prior Publication Data

US 2007/0148328 A1     Jun. 28, 2007

(51) Int. Cl.
*G02F 1/1337* (2006.01)
(52) U.S. Cl. .................. 428/1.2; 252/299.4; 430/270.1; 430/321; 349/124; 427/162
(58) Field of Classification Search .................. 428/1.2, 428/1.21; 252/299.4; 430/270.1, 321; 349/124; 427/162
See application file for complete search history.

(56) References Cited

U.S. PATENT DOCUMENTS

| | | | |
|---|---|---|---|
| 4,626,593 A * | 12/1986 | Parker et al. ................. | 546/339 |
| 5,225,285 A | 7/1993 | Hall et al. | |
| 5,334,485 A * | 8/1994 | Van Iseghem et al. .... | 430/287.1 |
| 5,389,698 A | 2/1995 | Chigrinov et al. | |
| 5,539,074 A * | 7/1996 | Herr et al. ................... | 526/326 |
| 5,928,561 A | 7/1999 | Bryan-Brown et al. | |
| 6,001,277 A | 12/1999 | Ichimura et al. | |
| 2002/0034709 A1* | 3/2002 | Fukuda et al. .............. | 430/320 |
| 2003/0021913 A1 | 1/2003 | O'Neill et al. | |
| 2004/0008305 A1* | 1/2004 | Payne et al. ................. | 349/117 |
| 2004/0209008 A1 | 10/2004 | Liang et al. | |
| 2004/0213924 A1 | 10/2004 | Nam et al. | |
| 2004/0219307 A1 | 11/2004 | Shin et al. | |

FOREIGN PATENT DOCUMENTS

JP         59-154442         9/1984

(Continued)

OTHER PUBLICATIONS

"Synthessis and Alignment of a Liquid Crystalline Polymethacrylate Bearing a Photoreactive 4-Styrylpyridine Derivative and Benzoate Group in the Same Side Chain" Kim et al., Polymer Reprints 2005, 46(2), 1012-1013.*

(Continued)

*Primary Examiner*—Keith D Hendricks
*Assistant Examiner*—Sophie Hon

(57) ABSTRACT

The present invention relates to a photoalignable material comprising a photoactive stilbazolium-containing polymer of formula I:

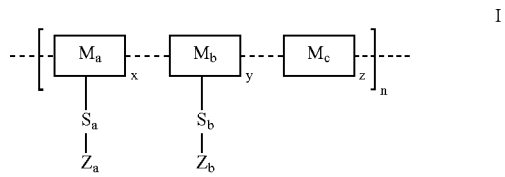

wherein,
$M_a$, $M_b$, $M_c$ are monomer units making up the polymer;
x, y, z, are mole fractions of the monomer units $M_a$, $M_b$, $M_c$, wherein in each case $0 < x \leq 1$; $0 \leq y < 1$, $0 \leq z < 1$;
$S_a$ and $S_b$ are spacer units; $Z_a$ is a stilbazolium unit which can undergo photochemical isomerization/dimerization reactions;
$Z_b$ is a stilbazole unit, and n varies from 4 to 10,000.

The present invention also relates to a display using a layer of the photoaligned material and methods for aligning the orientation layer as well as orienting a liquid crystal layer applied to the photoaligned orientation layer.

20 Claims, 2 Drawing Sheets

FOREIGN PATENT DOCUMENTS

| | | | |
|---|---|---|---|
| JP | 2000226415 A | * | 8/2000 |
| WO | 9949360 | | 9/1999 |

OTHER PUBLICATIONS

"Photocontrol of In-plane Alignment of a Nematic Liquid Crystal by a Photochromic Spiropyan Monolayer Absorbing Linearly Polarized Light" Ichimura et al., Chemistry Letters, 1992, p. 1063-1066.*

Yu Nagase et al., "A new class of second-order non-linear optical material: stilbazolium benzimidazolate covalently bound to polymer backbone", J. Mater. Chem, 1997, 7(8), pp. 1389-1393, 1997.*

59-154442 Japanese Abstract, Sep. 3, 1984.

2000-631199 Japanese Abstract, Aug. 15, 2000.

* cited by examiner

PHOTOALIGNMENT OF LIQUID CRYSTALS USING POLY(VINYLSTILBAZOLIUM) POLYMERS

FIELD OF THE INVENTION

The present invention relates to an alignment layer, and more particularly, to an alignment layer with photo-sensitivity.

BACKGROUND OF THE INVENTION

Liquid crystal devices (LCDs) normally comprise a thin cell containing a liquid crystal material, the upper and lower inside faces of the cell carrying (usually transparent) orientation layers. These innermost layers impart a preferred orientation to liquid crystal molecules in their vicinity by defining the actual arrangement of the liquid crystal director close to the boundary. This preferred orientation tends to persist even away from the orientation layers due to the strong interaction of the liquid crystal molecules.

The electro-optical effect in LCDs is substantially determined by the angle of twist through which the liquid crystal molecules pass from one side of the substrate to the other. Especially the contrast, brightness, viewing angle dependency and speed of the display, as well as the voltage required to actuate the liquid crystal display, can be adjusted to an optimum by means of the angle of twist. The liquid crystal properties required to obtain the electro-optical effect, such as the optical or the dielectric anisotropy, are determined by the angle of twist.

In order to establish a desired angle of twist, a preferred direction must be imposed on both substrate sides in contact with the liquid crystal. For that purpose, it is customary to apply to both substrate sides a thin polymer layer which is then rubbed in one direction, for example, with a cloth. Liquid crystals in contact with the orientation layer become oriented according to that preferred direction. The liquid crystal molecules must be sufficiently strongly anchored to the orientation layer for the molecules on the substrate surface to remain oriented in the desired direction, although the directions of orientation on the two sides of the substrate are generally different and, as a result, restoring forces occur. In that manner, it is possible to produce left- or right-rotating liquid crystal layers having an angle of twist of up to about 89°. At angles of 90° and above between the directions of orientation of the two substrates, the problem arises that the twist can occur either to the left or to the right, which, especially in the commercially widely available 90°-twisted liquid crystal displays, can result in areas being produced in which the liquid crystal rotates in the wrong direction (reverse twist), which leads to light scatter and a spotty appearance of the display.

Uniaxially rubbed polymer orientation layers, such as polyimide are conventionally used to orient liquid crystal molecules in liquid crystal displays. Although polyimides are very suitable as orientation layers by virtue of their good orientation properties there are a number of serious disadvantages that have less to do with the material itself than with the rubbing technique used to obtain the orientation. For example, in high-purity production environments, besides the dust produced during the rubbing process, electrostatic charges are generated on the surface of the substrate which attracts additional dust as well as interferes with the functioning of thin-film transistors (TFT) integrated under each pixel in LCDs.

The rubbing method is also subject to limitations because the increase in the miniaturization of LCDs, especially for use in projectors, and the growth in the number of pixels for high-resolution displays are resulting in ever smaller electrode structures, the dimensions of which are, in some cases, distinctly smaller than the diameter of the brush hairs used for the rubbing. Because of the topology of the substrate surfaces in TFT-LCDs, which is determined by the structure of the thin-film transistors, there are, for example, shadow areas that cannot be rubbed at all by the coarse fibers.

The problems associated with rubbed orientation layers can be solved using the photoalignment technique reported in U.S. Pat. No. 5,539,074 and International Publication No. WO 9949360 by Schadt et al., U.S. Pat. Application No. 2004/0219307 A1 by Shin et al., U.S. Pat. Application No. 2004/0213924 A1 by Nam et al., U.S. Pat. Application No. 2003/0021913 A1 by O'Neill et al., and U.S. Pat. Nos. 5,389,698 and 5,838,407 by Chigrinov et al, all incorporated herein by reference. In this method, anisotropic surfaces of the aligning layers are created using polarized light or a combination of polarized and non-polarized light irradiation. Cinnamate- and coumarin-containing polymers are usually used for this photoalignment technique because of their high photo- and thermal-stability of the induced alignment. Stable anisotropy in such materials is induced through the photo-dimerization (crosslinking) of photosensitive units. This method teaches the use of polymers, preferably of high molecular weight and soluble in organic solvents that are applied to a substrate and then photo-irradiated using ultraviolet light of wavelengths between 300-350 nm.

Another method used in the art for photoaligning is reported in U.S. Pat. No. 6,001,277 by Ichimura et al., incorporated herein by reference, uses a resin that contains a photoisomerizable and dichroic structural unit. Ichimura '277, however, does not disclose a resin with a photo-crosslinkable group, or applying an unreacted material to the substrate and then reacting and aligning by photo-irradiation. Polarized irradiation of anthracenyl containing polymers has been used for photoalignment. Thus, U.S. Pat. No. 5,928,561 by Bryan-Brown et al., incorporated herein by reference, uses a resin that contains a anthracenyl group which upon polarized irradiation at 325 nm results in photoalignment of liquid crystals.

PROBLEM TO BE SOLVED

The art lacks photo-crosslinkable materials that can be used for photoalignment using long wavelength (above 365 nm) irradiation and can be coated on substrates using solvents varying widely in polarity, including water.

SUMMARY OF THE INVENTION

The present invention relates to a photoalignable material comprising a photoactive stilbazolium-containing polymer of formula I:

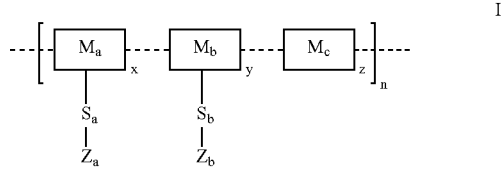

wherein:

$M_a$, $M_b$, $M_c$ are monomer units making up the polymer; x, y, z, are mole fractions of the monomer units $M_a$, $M_b$, $M_c$, wherein in each case $0<x\leq1$; $0\leq y<1$, $0\leq z<1$; $S_a$ and $S_b$ are spacer units; $Z_a$ is a stilbazolium unit which can undergo photochemical isomerization/dimerization reactions; $Z_b$ is a stilbazole unit, and n varies from 4 to 10,000.

The present invention also relates to a display comprising a support bearing at least one conductive layer, an electrically modulated imaging layer and an orientation layer, wherein said orientation layer comprises photoalignable material comprising a photoactive stilbazolium-containing polymer of formula I.

The present invention also relates to a method for forming a photoaligned orientation layer comprising coating at least one photoactive stilbazolium-containing polymer of formula I in a solvent onto a surface of a substrate to form a layer; drying said layer; and subjecting said layer to linearly polarized light of wavelength >350 nm to form a photoaligned orientation layer.

Also, the present invention relates to a method for orienting a liquid crystal layer comprising coating at least one photoactive stilbazolium-containing polymer of formula I in a solvent onto a surface of a substrate to form a layer; drying the layer; subjecting the layer to linearly polarized light of wavelength >350 nm to form a photoaligned orientation layer; coating a polymerizable liquid crystal material in a solvent over the photoaligned orientation layer; thermally treating the liquid-crystal material to remove the solvent to form an anisotropic liquid crystal layer; and exposing the liquid crystal material to UV light to cross-link the liquid crystal material.

The present invention relates to a method of forming a photoaligned orientation layer comprising applying at least one stilbazole polymer in a solvent onto a surface of a substrate to form a coating; drying the coating to form a layer; applying a protic acid in a solvent onto the layer to generate a photoactive stilbazolium-containing polymer of formula I, drying; and subjecting the layer to linearly polarized light of wavelength >350 nm to form a photoaligned orientation layer.

Finally, the present invention relates to a method of photoaligning liquid crystal materials comprising applying at least one stilbazole polymer in a solvent onto a surface of a substrate to form a coating; drying the coating to form a layer; applying a protic acid in a solvent onto the layer to generate a photoactive stilbazolium-containing polymer of formula I; drying; subjecting the layer to linearly polarized light of wavelength>350 nm to form a photoaligned orientation layer, coating a crosslinkable liquid crystal material in a solvent on the orientation layer to form a crosslinkable liquid crystal layer; drying the crosslinkable liquid crystal layer to remove the solvent; exposing the crosslinkable liquid crystal layer to UV light to crosslink the crosslinkable liquid crystal layer.

ADVANTAGEOUS EFFECT OF THE INVENTION

The present invention includes several advantages, not all of which are incorporated in a single embodiment. The invention provides photoalignment polymers comprising stilbazolium photoactive groups, and which show marked absorption of ultraviolet rays having 250-500 nm wavelengths, especially at wavelengths greater than 365. These polymers undergo efficient photo-crosslinking upon UV excitation at wavelengths greater than 365 nm (quantum efficiency, Φ~1), affording a photoalignment process that requires less energy. An additional advantage of the invention is the solubility of these polymers in polar solvents such as lower alcohols or water. Since stilbazolium polymers can be made soluble in a variety of solvents, these materials are conveniently coatable in multilayer format. The stilbazolium polymers are useful in a liquid-crystal photoalignment film for liquid crystal displays, such as, for example, OTFTs and PLEDs, and many other optical and electro-optical elements and components, such as color filters, polarization filters, retarder layers, and security elements, in which the liquid crystals may also be used in polymerised or crosslinked form.

For many display applications, alignment layers and anisotropic liquid crystal materials from organic solvents are coated onto a transparent plastic base. The solvents used to coat the alignment layer also act as attack or swelling agents for the support. This causes low molecular weight material in the base such as polymer, plasticizers, and dyes to be extracted from the support which then intermix with the alignment layer coating. The intermixing or interdiffusion of the two layers can prevent the alignment layer from aligning during the alignment process which results in a poor alignment of the liquid crystal layer particularly when the liquid crystal layer is a nematic or positive birefringent liquid crystal. The solvent coating of the alignment layer also causes unwanted curling of the support when materials such as triacetyl cellulose (or triacetate cellulose) are used as the support material. Since the present stilbazolium polymers are soluble in a variety of solvents, including lower alcohols or water, alignment layers containing these polymers may be coated onto plastic substrates without barrier layers.

BRIEF DESCRIPTION OF THE DRAWINGS

FIG. 3 (Curve B) illustrates the UV-Visible absorption spectra of Poly-1 dissolved in 1,2-dichloroethane (DCE) following the addition of incremental amounts of trifluoroacetic acid producing a new absorption band at 376 nm.

DETAILED DESCRIPTION OF THE INVENTION

The present invention relates to alignment of liquid crystals by using materials that comprise a substance that can be oriented and crosslinked by the action of linearly polarized light and which is used in the preparation of an orientation layer for a liquid crystal medium, and to an orientation layer for a liquid crystal medium and to an optical or electro-optical device having at least one such orientation layer.

The present invention relates to chemical compositions of stilbazolium polymers and a process for generation of a photoalignment layer. One embodiment of the invention is a method using a multiple wavelength light source to improve the efficiency of the alignment process. This is a non-contact technique to align liquid crystals so that the particulates and static charges generated by the rubbing process can be eliminated.

Figure 1:
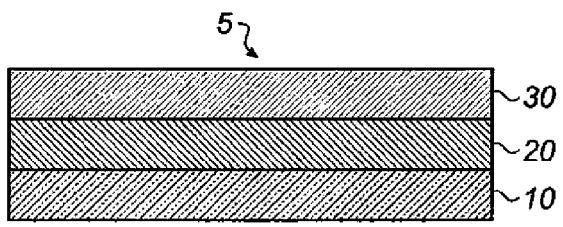
FIG. 1 is a cross-sectional schematic view of an oriented liquid crystal multilayer film according to the present invention.

The present invention provides a liquid-crystal alignment film comprising a polymer containing photoactive stilbazolium units, and with the ability to align liquid-crystal molecules when a film of the polymer is irradiated with linearly polarized light of wavelengths between 365-500 nm. The photoactive stilbazolium unit here refers to a derivative of a stilbazole molecule capable of undergoing photochemical reaction upon absorption of light, which changes its molecular structure. The photo-reaction may be either a reversible reaction or an irreversible reaction. The current invention is described by referring to FIG. 1 which shows a cross-sectional schematic view of an oriented liquid crystal multilayer film 5. This structure comprises a substrate 10 of transparent material, such as glass or polymer. It should be understood that to be called a substrate, it must be solid and mechanically strong so that it can stand alone and support other layers. The substrate can be flexible or rigid. A typical substrate is made of triacetate cellulose (TAC), polyester, polycarbonate, polysulfone, polyethersulfone, or other transparent polymers, and has a thickness of 25 to 500 micrometers. Substrate 10 typically has low in-plane retardation, preferably less than 10 nm, and more preferably less than 5 nm. In some other cases, the substrate 10 may have larger in-plane retardation (some short discussion of the relevance of retardation might be useful here or in the introduction) between 15 to 150 nm. Typically, when the substrate 10 is made of triacetyl cellulose, it has out-of-plane retardation around −40 nm to −120 nm. This is a desired property when the compensator is designed to compensate a liquid crystal state with an ON voltage applied.

The in-plane retardation discussed above is defined as the absolute value of $(n_x-n_y)*d$ and the out-of-plane retardation discussed above is defined as $[(n_x+n_y/2)-n_z]*d$, respectively. The refractive indices $n_x$ and $n_y$ are along the slow and fast axes in plane of the substrate 10, respectively, $n_z$ is the refractive index along the substrate thickness direction (Z-axis), and d is the substrate 10 thickness. The substrate is preferably in the form of a continuous (rolled) film or web. Glass plates, ITO-coated substrates, color filter substrates, quartz plates, silicon wafers, can also be used as substrates.

The substrate 10 can be used alone or as a pair. In the case of usage as a pair, if necessary, a spacer, a sealing agent or the like can also be used. In this invention, it is preferable that the layer adjacent to the liquid crystal layer is the layer nearest the liquid crystal layer 30 among the layers located between the substrate and the liquid crystal layer 30. It is also acceptable that the layer adjacent to the liquid crystal layer 30 functions as an orientation film or a transparent electrode.

On the substrate 10, an orientation layer 20 is applied, and a liquid crystal layer 30 is disposed on top of layer 20. The orientation layer 20 contains photo-crosslinkable material and can be oriented by a linearly polarized irradiation above 365 nm. In a preferred embodiment, the photo-crosslinkable materials are inventive stilbazolium polymers. Such materials may be oriented and simultaneously cross-linked by selective irradiation with linear polarized UV light.

Mainly liquid crystal molecules constitute the liquid crystal layer 30. As the liquid crystal molecules, discotic liquid crystal molecules, rod-shaped (nematic) liquid crystal molecules, and cholesteric liquid crystal molecules can be used. Nematic liquid crystal molecules are especially preferred. Two or more types of liquid crystal molecules can also be used in combination. Components (such as a colorant, a dopant for tilt angle increase, dichroic colorant, polymer, polymerizing agent, sensitizing agent, phase transition temperature depressant, and stabilizer) can also be added to the liquid crystal layer in addition to the liquid crystal molecules. A variety of well established methods can be used to apply the liquid crystal layer 30 to the substrate. Accordingly, liquid crystal layer 30 can be coated on the orientation layer 20 using, the curtain coating method, extrusion coating method, roll coating method, spin coating method, dip coating method, bar coating method, spray coating method, printing coating method, and the like.

In one embodiment of the invention, the liquid crystal layer 30 is typically a nematic liquid crystalline pre-polymer when it is first disposed on the orientation layer 20, and is cross-linked by a further UV irradiation, or by other means such as heat. In a preferred embodiment, the anisotropic layer contains a material such as a diacrylate or diepoxide with positive birefringence as disclosed in U.S. Pat. No. 6,160,597 (Schadt et al.) and U.S. Pat. No. 5,602,661 (Schadt et al.), both incorporated herein by reference. The optical axis in the anisotropic liquid crystal layer 30 is usually tilted relative to the layer plane, and varies across the thickness direction. The anisotropic liquid crystal layer 30 in accordance with the present invention is applied from a liquid medium containing an azolium salt or a mixture of azolium salts. In the present invention, the stilbazolium polymer is used for the alignment of liquid crystal molecules.

When the photoalignment film containing stilbazolium units is irradiated with linearly polarized light, the stilbazolium molecules, whose easy light-absorption axes are directed in the same direction as the electric-field vector of the polarized light, selectively undergo a photo-cycloaddition reaction. Herein, the easy light-absorption axis refers to the axial direction in which the transition moment of light absorption is largest. Hence, as a result of irradiation with polarized light, the number of stilbazolium molecules whose easy light-absorption axes are directed in the same direction as the electric-field vector of the polarized light becomes smaller than the number of stilbazolium molecules whose easy light-absorption axes are directed in the direction falling at right angles to the electric-field vector of the polarized light. That is, in-plane anisotropy takes place in the film of the resin containing stilbazolium molecules. Accordingly, the process of linear polarized irradiation of a layer comprising a stilbazolium containing polymer induces anisotropy in the direction of the irradiation. Upon contact of liquid-crystal molecules with the surface of the film in which the in-plane anisotropy has been caused to take place in this way, the liquid-crystal molecules align in a direction parallel to the direction of polarized irradiation.

To prepare the photoalignment layer, the stilbazolium polymer layer is exposed to linearly polarized light to induce photo-cycloaddition of stilbazoliums. This in turn gives rise to a homogeneous anisotropic orientation of the liquid crystal molecules as a result of the dispersion forces at the alignment layer-liquid crystal interface. This liquid crystal orientation is in general parallel to the incidence angle of the illumination.

According to one embodiment the liquid-crystal alignment film of the present invention can be obtained by using a resin having a reactive functional group.

One embodiment of the present invention is a homo- or copolymer of the general formula I:

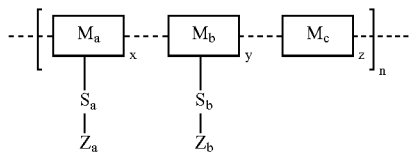

wherein, $M_a$, $M_b$, $M_c$ are monomer units making up the homo- or copolymer;

x, y, z, are mole fractions of the comonomers, whereby in each case $0 < x \leq 1$; $0 \leq y < 1$;

$S_a$ and $S_b$ are spacer units;

$Z_a$ is a stilbazolium unit which can undergo photochemical isomerization/dimerization reactions;

and $Z_b$ is a stilbazole unit, n is a magnitude of 4-10,000

It is understood that n can also be greater than 10,000 units. In a preferred embodiment, z is equal to 0.

The monomer units $M_a$, $M_b$ and $M_c$ set forth in formula I are units for the formation of homopolymers or copolymers and have, in the scope of the present invention, the structures which are usual in polymer chemistry. Such monomer units are, for example, acrylate, methacrylate, 2-chloroacrylate, 2-phenylacrylate, acryloylphenylene, acrylamide, methacrylamide, 2-choroacrylamide, 2-phenylacrylamide, vinyl ether, styrene derivatives, vinyl ester, vinyl acetal, maleic acid derivatives, fumaric acid derivatives, terephthalic acid derivatives, isophthalic acid derivatives, adipic acid derivatives, cyclohexanedimethanol, an alkylene glycol, siloxanes, epoxides and the like. Acrylate, methacrylate, 2-chloroacrylate, acrylamide, methacrylamide, 2-chloroacrylamide, styrene derivatives, vinyl acetal, siloxanes and the like are preferred monomer units.

Under the term "copolymers" there are to be understood not only statistical copolymers but also alternating copolymers, for example alternating copolymers from maleic acid derivatives with styrene, or block copolymers. Statistical copolymers are preferably used. Homopolymers embrace linear, branched and cyclic polymers such as, for example, cyclic polysiloxane.

Polymers in which z=0, but especially homopolymers of formula II are especially preferred.

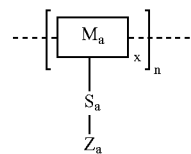

The spacer units $S_a$ join the isomerization/dimerization unit $Z_a$ with the monomer unit $M_a$. In the present instance the term "spacer units" $S_a$ signifies, for example, independently of one another, an alkylene chain with 1 to 10, preferably with 1 to 6, carbon atoms, a cycloalkylene group with 3 to 8 carbon atoms, preferably with 5 or 6 carbon atoms, in which optionally one or two methylene groups can be replaced by NH groups, or phenylene, which can be substituted with lower alkyl, lower alkoxy, —CN, —NO$_2$, but especially with halogen, or carbonate, an ester group, an amide group, an ether group and the like or a combination of the groups.

Methylene, 1,2-ethylene, 1,3-propylene, 1,4-butylene, 1,2-propylene, 1,3-butylene, cyclopentane-1,2-diyl, cyclopentane-1,3-diyl, cyclohexane-1,3-diyl, cyclohexane-1,4-diyl, piperidine-1,4-diyl, piperazine-1,4-diyl, 1,2-phenylene, 1,3-phenylene, 1,4-phenylene, ethyleneoxy, ethyleneoxycarbonyl, ethylenecarboxyl, CONH— and —CONR' in which R' signifies lower alkyl are examples of preferred spacer units ($S_a$ and $S_b$).

The isomerization/dimerization unit $Z_a$ is a molecular unit which can undergo either photochemical cis/trans-isomerization or photochemical [2+2] cycloaddition and thus lead to a cross-linking of the polymer or oligomer. The isomerization/dimerization unit $Z_a$ is, as already mentioned, linked via the spacer $S_a$ to the monomer unit $M_a$, and has the general formula III-A or III-B:

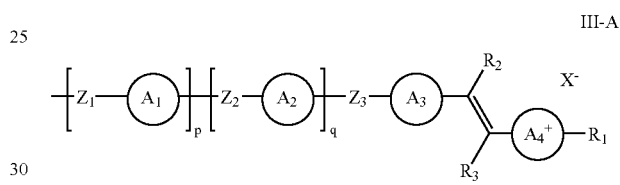

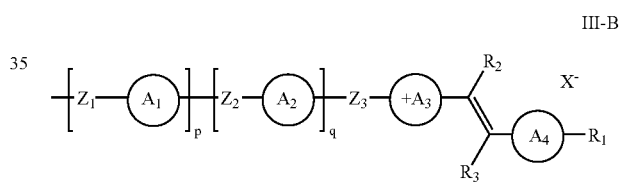

In formulae III-A and III-B, rings $A_1$ and $A_2$ each individually signify 1,4-phenylene, which is unsubstituted or substituted with halogen, cyano and/or nitro and in which 1 or 2 CH groups can be replaced by nitrogen, or 2,5-thiophenediyl, 2,5-furanylene, trans-1,4-cyclohexylene, trans-1,3-dioxane-2,5-diyl or 1,4-piperidyl; 1,4- or 2,6-naphthylene; or 4,4'-biphenylene. Rings $A_3$ and $A_4$ each individually signify 1,4-phenylene, which is unsubstituted or substituted with halogen, cyano and/or nitro and in which 1 or 2 CH groups can be replaced by nitrogen, or 2,5-thiophenediyl, 2,5-furanylene, 1,4- or 2,6-naphthylene, in which a CH group can be replaced by nitrogen. Either $A_3$ or $A_4$ signifies a pyridyl group which is unsubstituted or substituted with halogen, cyano and/or nitro. In one embodiment formula III-A, $A_4$ signifies a pyridyl group and $R_1$ is a group that quarternizes nitrogen of pyridyl group and signifies H or an alkyl group of from 1 to 12 carbon atoms. In second embodiment formula III-B, $A_3$ is a quarternized pyridyl group. $Z_1$, $Z_2$, and $Z_3$ each independently signify a single covalent bond, —CH$_2$CH$_2$—, —O—, —COO—, —OOC—, —NHCO—, —CONH—OCH$_2$—, —CH$_2$O—, —C triple bond C—, —(CH$_2$)$_4$—, —O(CH$_2$)$_3$—, —(CH$_2$)$_3$O— or the trans form of —OCH$_2$CH=CH—, —CH=CHCH$_2$O—, —(CH$_2$)$_2$CH=CH— or —CH=CH(CH$_2$)$_2$—; p and q each independently signify 0 or 1; $R_1$ signifies an electron pair, H or an alkyl group of from 1 to 12 carbon atoms. $R_2$ and $R_3$ each independently signify hydrogen, halogen, cyano, alkyl with 1 to 12 carbon atoms which is optionally substituted with fluorine and in which optionally 1 or 2 non-adjacent —$CH_2$—groups can be replaced by oxygen, —COO—, —OOC—, —CO— and/or —CH═CH—. $X^-$ signifies a charge balancing monovalent anion which may be a separate moiety, such as $Cl^-$, $Br^-$, $I^-$, $PF_6^-$, $BF_4^-$, and $CH_3SO_4^-$ or part of the $R_1$.

The ethene groups of the isomerization/dimerization units of formulae III-A and III-B which are not or only to a small extent incorporated into the polymer under the polymerization conditions, can be selectively aligned, after the application of the polymer layer to a carrier, by irradiation with linear polarized light. This takes place either by isomerization of the ethene group, by dimerization of the ethene group or by simultaneous isomerization and dimerization of these ethene groups. Very specific surface regions can be aligned by the selective irradiation of the molecule units of formula III and these regions are also simultaneously stabilized by the dimerization.

The term "1,4-phenylene, which is unsubstituted or substituted with halogen, cyano and/or nitro and in which 1 or 2 CH groups can be replaced by nitrogen" includes 1,4-phenylene, 2-fluoro-1,4-phenylene, 2,3-difluoro-1,4-phenylene, 2,6-difluoro-1,4-phenylene, 2-chloro-1,4-phenylene, 2,3-dichloro-1,4-phenylene, 2,6-dichloro-1,4-phenylene, 2-cyano-1,4-phenylene, 2,3-dicyano-1,4-phenylene, 2-nitro-1,4-phenylene, 2,3-dinitro-1,4-phenylene, 2-bromo-1,4-phenylene, 2-methyl-1,4-phenylene, as well as pyridine-2,5-diyl, pyrimidine-2,5-diyl and the like. 1,4-phenylene, 2-fluoro-1,4-phenylene, 2,3-difluoro-1,4-phenylene, 2,6-difluoro-1,4-phenylene, pyridine-2,5-diyl or pyrimidin-2,5-diyl are especially preferred.

The term "alkyl with 1 to 12 carbon atoms which is optionally substituted with fluorine and in which optionally 1 or 2 non-adjacent —$CH_2$— groups can be replaced by oxygen, —COO—, —OOC—, —CO— and/or —CH═CH—" includes straight-chain and branched (optionally chiral) residues such as alkyl, alkenyl, alkoxy, alkenyloxy alkoxyalkyl, alkenyloxyalkyl, alkoxyalkenyl, 1-fluoroalkyl, 1,1-difluoroalkyl, 2-fluoroalkyl, 2-fluoroalkoxy, terminal fluoroalkyl, terminal difluoromethylalkyl, terminal trifluoromethylalkyl, terminal trifluoromethylalkoxy, and the like with 1 or, respectively, 2 to 12 carbon atoms. Examples of preferred residues are methyl, ethyl, propyl, butyl, pentyl, hexyl, heptyl, octyl, 1-methylpropyl, 1-methylheptyl, 2-methylbutyl, 3-methylpentyl, vinyl, 1E-propenyl, 1E-butenyl, 1E-pentenyl, 1E-hexenyl, 3-butenyl, 3E-pentenyl, 3E-hexenyl, 4-pentenyl, 4Z-hexenyl, 5-hexenyl, 6-heptenyl, 7-octenyl, methoxy, ethoxy, propyloxy, butyloxy, pentyloxy, hexyloxy, heptyloxy, octyloxy, 1-methylpropyloxy, 1-methylheptyloxy, 2-methylbutyloxy, allyloxy, 2E-butenyloxy, 2E-pentenyloxy, 3-butenyloxy, 3Z-pentenyloxy, 4-pentenyloxy, 5-hexenyloxy, 6-heptenyloxy, 7-octenyloxy, 2-methoxyethyl, 3-methoxypropyl, 3-methoxy-1E-propenyl, 1-fluoropropyl, 1-fluoropentyl, 2-fluoropropyl, 2,2-difluoropropyl, 3-fluoropropyl, 3,3-difluoropropyl, 3,3,3-trifluoropropyl, 2-fluoropropyloxy, 3-fluoropropyloxy, 2,2-difluorovinyl, 2-(3,3-difluoro)propenyl and the like. Especially preferred residues have 1 or, respectively, 2 to 6 carbon atoms.

The term "halogen" includes fluorine, chlorine, bromine and iodine, but especially fluorine and chlorine.

One preferred embodiment of the present invention is a homo- or copolymer of the general formula IV:

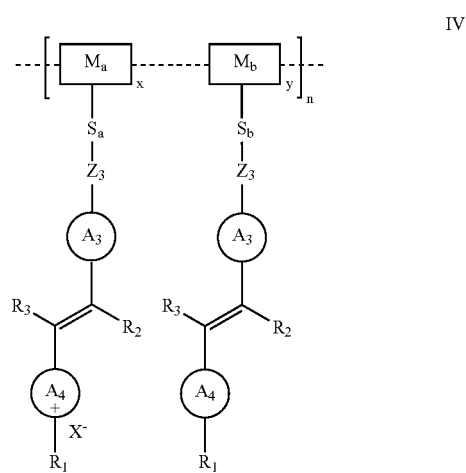

IV wherein,
x is the mole fraction of the comonomers in which $A_4^+$ is a pyridyl ring which is quaternized; y is the mole fraction of the comonomers in which $A_4$ is a pyridyl ring which is unquaternized;
and $0<x\leq 1$; $0\leq y<1$;

In yet another preferred embodiment of the present invention the isomerization/dimerization units of formula I is a compound of the general formula V:

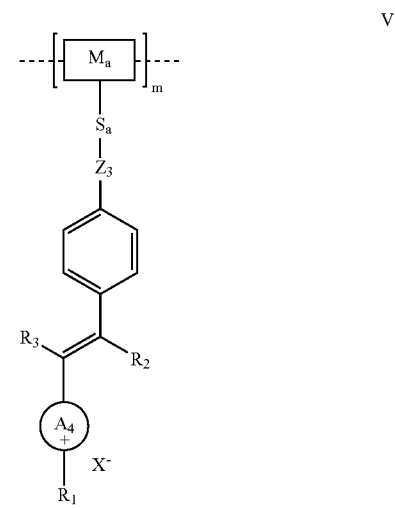

V

As previously mentioned, monomer units $M_a$ set forth in formula V are units for the formation of copolymers and have, in the scope of the present invention, the structures which are usual in polymer chemistry. Preferred are units containing one or more ethylenically unsaturated polymerizable acrylic or methacrylic acid ester or amide monomers such as methyl acrylate, ethyl acrylate, isopropyl acrylate, methyl methacrylate, ethyl methacrylate, isopropyl methacrylate, n-butyl acrylate, t-butyl methacrylate, isodecyl methacrylate, isobutyl methacrylate, cyclohexyl methacrylate, cyclohexyl acrylate, lauryl methacrylate, methyl acrylamide, ethyl methacrylamide, vinyl acetate, vinyl alcohol, vinyl acetal, and others that would be readily apparent to one skilled in the art.

Examples of preferred monomers containing stilbazole or stilbazolium groups useful in the invention are collected in Table X.

TABLE X

Monomers containing stilbazole or stilbazolium groups

Mnr-1
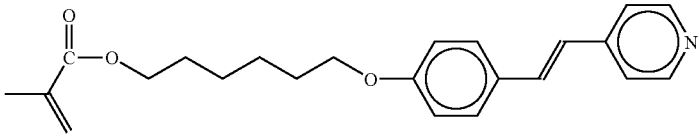

Mnr-2
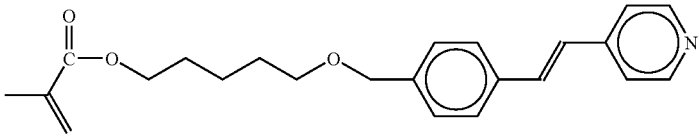

Mnr-3
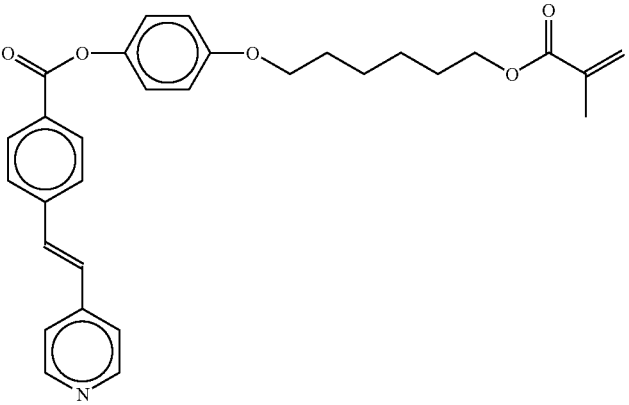

Mnr-4
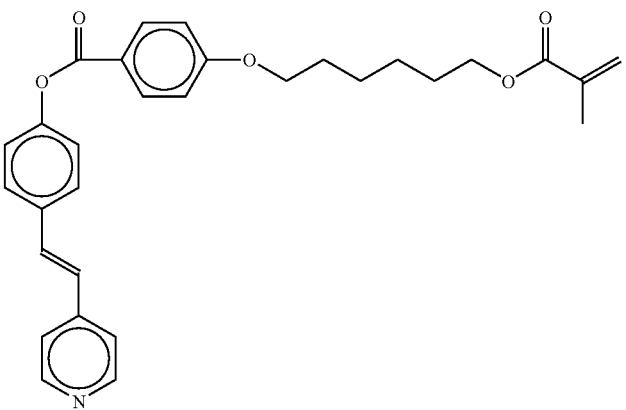

TABLE X-continued
Monomers containing stilbazole or stilbazolium groups
Mnr-5
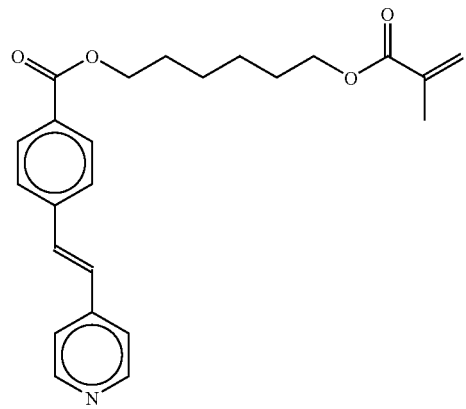
Mnr-6
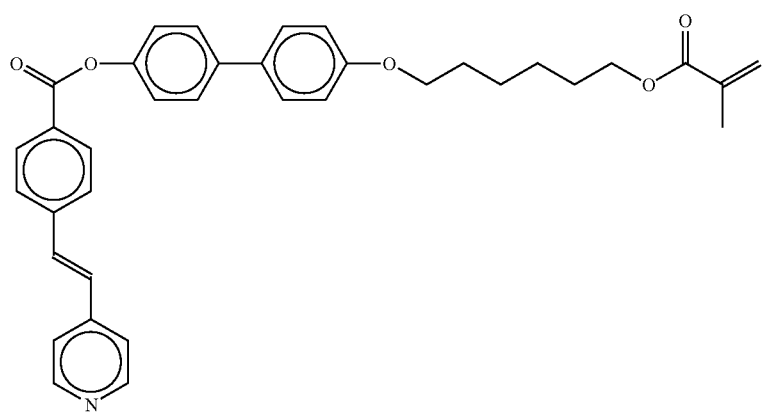
Mnr-7
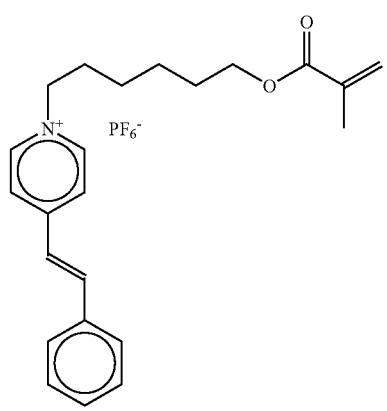

The monomers in Table X were polymerized, either singly or with appropriate comonomers, using techniques well-known to those familiar with the art. Examples of homo- and copolymers containing stilbazole or stilbazolium groups useful in the invention are collected in Table Y.

TABLE Y

Homo- and copolymers containing stilbazole or stilbazolium groups. Numbers in parentheses are the mole ratios of comonomers.

| Polymer | Composition |
|---|---|
| Poly-1 | Mnr-1-100 |
| Poly-2 | Mnr-1-co-methyl methacrylate (5/95) |
| Poly-3 | Mnr-1-co-methyl methacrylate (10/90) |
| Poly-4 | Mnr-1-co-methyl methacrylate (20/80) |
| Poly-5 | Mnr-1-co-benzyl methacrylate (20/80) |
| Poly-6 | Mnr-2-100 |
| Poly-7 | Mnr-2-co-methyl methacrylate (5/95) |
| Poly-8 | Mnr-2-co-methyl methacrylate (10/90) |
| Poly-9 | Mnr-2-co-methyl methacrylate (20/80) |
| Poly-10 | Mnr-3-100 |
| Poly-11 | Mnr-4-100 |
| Poly-12 | Mnr-5-100 |
| Poly-13 | Mnr-6-100 |
| Poly-14 | Mnr-7VII-100 |
| Poly-15 | Mnr-7VII-co-methyl methacrylate (30/70) |

Homo- and copolymers containing stilbazole groups were treated with a strong acid or an alkylating agent to produce polymers containing stilbazolium groups useful in the invention. Thus treatment of the stilbazole-containing polymer 12 with trifluoroacetic acid produced the stilbazolium-containing polymer 12-TFA. Similarly, the reaction of the stilbazole-containing polymer 4 with dimethyl sulfate produced the stilbazolium-containing polymer 4-Me MeSO$_4$.

Stilbazole-containing and/or stilbazolium-containing monomers can be polymerized, optionally with comonomer(s) Mc, using conventional methods familiar to those skilled in the art to afford linear polymers with controlled molecular weight and solubility. These methods include, but are not limited to, bulk, solution, emulsion, suspension, chain-growth, ring-opening, condensation, or step-growth polymerization. Subsequently, some or all of the stilbazole groups can be converted to stilbazolium groups by treatment with Bronsted or Lewis acid or by alkylation with a suitable alkylating agent. Examples of acids that are useful in the invention include trifluoroacetic acid, trichloroacetic acid, hydrochloric acid, methanesulfonic acid, etc.

Examples of alkylating agents useful in the invention include bromomethane, iodomethane, iodoethane, trimethyloxonium tetrafluoroborate, dimethyl sulfate, iodomethane, bromoethane, iodoethane, diethyl sulfate, and triethyloxonium tetrafluoroborate.

As noted above, Z in Formulas I and II represents at least one ethylenically unsaturated monomer. Examples of these include styrene or alpha-alkylstyrene, where the alkyl group has from 1 to 4 carbon atoms and the aromatic group may be substituted or part of a larger ring system. Other examples of Z include acrylate esters derived from aliphatic alcohols or phenols; methacrylate esters; acrylamides; methacrylamides; N-vinylpyrrolidone or suitably substituted vinyl pyrrolidones; vinyl esters derived from straight-chain or branched-chain acids, e.g., vinyl acetate; vinyl ethers, e.g., vinyl methyl ether; vinyl ketones; halogen-containing monomers such as vinyl chloride; and olefins, such as butadiene. In a preferred embodiment, Z represents acrylate or methacrylate esters.

It will also be understood that according to the invention it is possible to use not just one substance but also a plurality of substances in the photoalignment material, and any desired combination of polymers, oligomers and monomers can be taken into consideration.

The present invention also relates to methods of photo-aligning liquid crystals. One such method comprises:
(i) coating a stilbazolium photoalignable polymer in a solvent onto a surface of a substrate to form a layer;
ii) drying said layer;
iii) subjecting said layer to linearly polarized light of wavelength >350 nm to form a photoaligned orientation layer.

The polarized irradiation process may be accomplished by using an apparatus as described in European Patent Application EP 1,380,873 A2, the contents of which are incoporated herein by reference.

In another method, a liquid crystal layer may be oriented by:
(i) coating a stilbazolium photoalignable polymer in a solvent onto a surface of a substrate to form a layer;
ii) drying said layer;
iii) subjecting said layer to linearly polarized light of wavelength >350 nm to form a photoaligned orientation layer;
iv) coating a liquid crystal layer comprising a polymerizable material in a solvent carrier over the orientation layer;
v) thermally treating the liquid-crystal-containing layer in order to remove the solvent to form an anisotropic liquid crystal layer exhibiting its functional phase, preferably the nematic phase of a nematic liquid-crystal compound.
vi) exposing the liquid crystal layer to UV light to cross-link the liquid crystal layer.

The liquid crystal materials are preferably diacrylates or diepoxides with positive birefringence as disclosed in U.S. Pat. No. 6,160,597 (Schadt et al.) and U.S. Pat. No. 5,602,661 (Schadt et al.), incorporated herein by reference. The liquid crystal layer may also contain addenda such as surfactants, light stabilizers and UV initiators as described in European Patent Application EP 1,380,873 A2, the contents of which are incoporated herein by reference. The liquid crystal layer may also contain a polymeric additive to increase the viscosity of the coating solution used to apply the layer.

Another method of photoaligning liquid crystals comprises a process for generating stilbazolium layer on the substrate:
i) applying a stilbazole polymer in a solvent onto a surface of a substrate to form a coating;
ii) drying said coating to form a layer;
iii) applying a protic acid in a solvent onto the layer to generate stilbazolium;
ii) drying;
iii) subjecting the layer to photoalignment by linearly polarized light of wavelength >350 nm to form an orientation layer;
iv) coating a liquid-crystalline compound in a solvent on the orientation layer to form a liquid-crystal layer;
v) drying the liquid-crystal layer in order to remove the solvent and form an anisotropic liquid crystal layer exhibiting its functional phase,
vii) exposing the liquid crystal layer to UV light to crosslink the liquid crystal layer.

The polarized irradiation process may be accomplished by using an apparatus as described in European Patent Application EP 1,380,873 A2, the contents of which are incorporated herein by reference. In one embodiment, the liquid crystal materials are diacrylates or diepoxides with positive birefringence as disclosed in U.S. Pat. No. 6,160,597 (Schadt et al.) and U.S. Pat. No. 5,602,661 (Schadt et al.), preferably the nematic phase of a nematic liquid-crystal compound. The liquid crystal layer may also contain addenda such as surfactants, light stabilizers and UV initiators as described in European Patent Application EP 1,380,873 A2, the contents of which are incorporated herein by reference. The liquid crystal layer may also contain a polymeric additive to increase the viscosity of the coating solution used to apply the layer.

In another method for the preparation of orientation layer comprising of a mixture of stilbazolium polymers for photoalignment of liquid crystals is prepared by:
(i) coating an orientation layer comprising a mixture of two stilbazolium photoalignable polymers in a solvent onto a surface of a substrate;
ii) drying the orientation layer;
iii) subjecting the layer to photoalignment by linearly polarized light of wavelength >350 nm;
iv) coating a liquid crystal layer comprising a polymerizable material in a solvent carrier over the orientation layer;
v) thermally treating the liquid-crystal-containing layer in order to remove the solvent and form an anisotropic liquid crystal layer exhibiting its functional phase, preferably the nematic phase of a nematic liquid-crystal compound;
vi) exposing the liquid crystal layer to UV light to cross-link the liquid crystal layer.

Another process for the preparation of a continuous optical compensator sheet comprising at least two orientation layers, by coating a photoalignable inventive stilbazolium in an aqueous solution onto a surface of a continuous transparent film already having a first stilbazolium orientation layer and an anisotropic liquid-crystalline layer thereon. This process comprises:
(i) coating an orientation layer comprising a mixture of two stilbazolium photoalignable polymers in a solvent onto a surface of a substrate;
ii) drying the orientation layer;
iii) subjecting the layer to photoalignment by linearly polarized light of wavelength >350 nm;
iv) coating a liquid crystal layer comprising a polymerizable material in a solvent carrier over the orientation layer;
v) thermally treating the liquid-crystal-containing layer in order to remove the solvent and form an anisotropic liquid crystal layer exhibiting its functional phase, preferably the nematic phase of a nematic liquid-crystal compound;
vi) exposing the liquid crystal layer to UV light to cross-link the liquid crystal layer;
vii) coating a photoalignable inventive stilbazolium in an aqueous solution onto a surface of a continuous transparent film already having a first stilbazolium orientation layer and an anisotropic liquid-crystalline layer thereon;
viii) drying the coating to form a layer; and
ix) subjecting the second stilbazolium layer to a photoalignment treatment by linearly polarized light of wavelength >350 nm, whereby a second orientation layer is formed;
x) coating an anisotropic liquid-crystalline compound, in a solvent, onto the second orientation layer to form a liquid-crystal-containing layer;
xi) thermally treating the liquid-crystal-containing layer in order to form an anisotropic liquid-crystal-containing layer having a functionally oriented phase;
xii) exposing the liquid crystalline layer to UV light to crosslink the liquid crystal layer;
xiii) optionally winding up the compensator sheet comprising the transparent support, the orientation layers, and the anisotropic liquid-crystal layers;
xiv) heat treating the second orientation layer wherein the heat treatment can occur either before or after, or both before or after, the alignment step iii);

The present process can be used to make an optical compensator film that widens the viewing angle characteristics of liquid crystal displays, and in particular of Twisted Nematic (TN), Super Twisted Nematic (STN), Optically Compensated Bend (OCB), In Plane Switching (IPS), or Vertically Aligned (VA) liquid crystal displays.

In one embodiment, a support bearing a conductive layer is used in a flat panel display used in various electronic devices. At a minimum, the display comprises a substrate, at least one conductive layer an electrically modulated imaging layer. In a preferred embodiment, the conductive layer is ITO and the imaging layer is a liquid crystalline material. The display may also comprise two sheets of polarizing material with an electrically modulated imaging solution between the polarizing sheets. The sheets of polarizing material may be a substrate of glass or transparent plastic. The display may also include functional layers. In one embodiment, a transparent, multilayer flexible support is coated with a first conductive layer, which may be patterned, onto which is coated an electrically modulated imaging layer. A second conductive layer is applied and overcoated with a functional layer. Dielectric conductive row contacts are attached, including via holes that permit interconnection between the conductive layers and the dielectric conductive row contacts. In a typical matrix-address light-emitting display device, numerous light-emitting devices are formed on a single substrate and arranged in groups in a regular grid pattern. Activation may be by rows and columns, or in an active matrix with individual cathode and anode paths.

The display includes a suitable electrically modulated material disposed on a suitable support structure, such as on or between one or more electrodes. The electrically imageable material can be light emitting or light modulating. Light emitting materials' can be inorganic or organic in nature. Particularly preferred are organic light emitting diodes (OLED) or polymeric light emitting diodes (PLED). The light modulating material can be reflective or transmissive. The electrically imageable material can be addressed with an electric field and then retain its image after the electric field is removed, a property typically referred to as "bistable". The electrically modulated material may be electrochromic material, electrochemical, electrophoretic, such as Gyricon particles, rotatable microencapsulated microspheres, liquid crystal materials, cholesteric/chiral nematic liquid crystal materials, polymer dispersed liquid crystals (PDLC), polymer stabilized liquid crystals, surface stabilized liquid crystals, smectic liquid crystals, ferroelectric material, electroluminescent material or any other of a very large number of light modulating imaging materials known in the prior art. The liquid crystalline material can be twisted nematic (TN), super-twisted nematic (STN), ferroelectric, magnetic, or chiral nematic liquid crystals. Especially preferred are chiral nematic liquid crystals. The chiral nematic liquid crystals can be polymer dispersed liquid crystals (PDLC). Structures having stacked imaging layers or multiple support layers, however, are optional for providing additional advantages in some case.

The liquid crystal (LC) is used as an optical switch. The supports are usually manufactured with transparent, conductive electrodes, in which electrical "driving" signals are coupled. The driving signals induce an electric field which can cause a phase change or state change in the LC material, the LC exhibiting different light-reflecting characteristics according to its phase and/or state.

Liquid crystals may be nematic (N), chiral nematic (N*), or smectic, depending upon the arrangement of the molecules in the mesophase. In the preferred embodiment, the electrically modulated material is a chiral nematic liquid crystal incorporated in a polymer matrix. Chiral nematic liquid crystalline materials may be used to create electronic displays that are both bistable and viewable under ambient lighting. Furthermore, the liquid crystalline materials may be dispersed as micron sized droplets in an aqueous medium, mixed with a suitable binder material and coated on a flexible conductive support to create potentially low cost displays. The operation of these displays is dependent on the contrast between the planar reflecting state and the weakly scattering focal conic state.

Chiral nematic liquid crystal refers to the type of liquid crystal having finer pitch than that of twisted nematic and super-twisted nematic. Chiral nematic liquid crystals are so named because such liquid crystal formulations are commonly obtained by adding chiral agents to host nematic liquid crystals. Chiral nematic liquid crystals may be used to provide bistable and multistable reflective displays that, due to their non-volatile "memory" characteristic, do not require a continuous driving circuit to maintain a display image, thereby significantly reducing power consumption. Chiral-nematic displays are bistable in the absence of a field, the two stable textures being the reflective planar texture and the weakly scattering focal conic texture. In the planar texture, the helical axes of the chiral nematic liquid crystal molecules are substantially parallel to the support upon which the liquid crystal is disposed. In the focal conic, state the helical axes of the liquid crystal molecules are generally randomly oriented. By adjusting the concentration of chiral dopants in the chiral nematic material, the pitch length of the molecules and, thus, the wavelength of radiation that they will reflect, may be adjusted. Chiral nematic materials that reflect infrared radiation have been used for purposes of scientific study. Commercial displays are most often fabricated from chiral nematic materials that reflect visible light. Some known LCD devices include chemically-etched, transparent, conductive layers overlying a glass substrate as described in U.S. Pat. No. 5,667,853, incorporated herein by reference. The present invention may employ, as a light-modulating layer, chiral-nematic liquid-crystal compositions dispersed in a continuous matrix. Such materials are referred to as "polymer-dispersed liquid crystal" materials or "PDLC" materials.

Modern chiral nematic liquid crystal materials usually include at least one nematic host combined with a chiral dopant. Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory. The chiral nematic liquid crystal is typically a mixture of nematic liquid crystal and chiral material in an amount sufficient to produce the desired pitch length.

Chiral nematic liquid crystal materials and cells, as well as polymer stabilized chiral nematic liquid crystals and cells, are well known in the art and described in, for example, U.S. Pat. No. 5,695,682, U.S. application Ser. Nos. 07/969,093, 08/057,662, Yang et al., Appl. Phys. Lett. 60(25) pp 3102-04 (1992), Yang et al., J. Appl. Phys. 76(2) pp 1331 (1994), published International Patent Application No. PCT/US92/09367, and published International Patent Application No. PCT/US92/03504, all of which are incorporated herein by reference.

The liquid crystalline layer or layers may also contain other ingredients. For example, while color is introduced by the liquid crystal material itself, pleochroic dyes may be added to intensify or vary the color reflected by the cell. Similarly, additives such as fumed silica may be dissolved in the liquid crystal mixture to adjust the stability of the various chiral nematic textures. A dye in an amount ranging from about 0.25% to about 1.5% may also be used.

At least one curable conductive layer is present in display devices. A first conductor is formed over substrate. The first conductor can be a transparent, electrically conductive layer of tin-oxide or indium-tin-oxide (ITO), with ITO being the preferred material. Alternatively, first conductor can be an opaque electrical conductor formed of metal such as copper, aluminum or nickel. If first conductor is an opaque metal, the metal can be a metal oxide to create a light absorbing first conductor. This conductive layer may comprise other metal oxides such as indium oxide, titanium dioxide, cadmium oxide, gallium indium oxide, niobium pentoxide and tin dioxide. See, Int. Publ. No. WO 99/36261 by Polaroid Corporation, incorporated herein by reference. In addition to the primary oxide such as ITO, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.), incorporated herein by reference Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$—$In_2O_3$, or $TaO_3$.

The conductive layer may be formed, for example, by a low temperature sputtering technique or by a direct current sputtering technique, such as DC sputtering or RF-DC sputtering; depending upon the material or materials of the underlying layer. Typically, the conductive layer is sputtered onto the substrate to a resistance of less than 250 ohms per square.

A second conductor may be applied to the surface of light modulating imaging layer. The second conductor should have sufficient conductivity to carry a field across light modulating imaging layer. The second conductive layer may comprise any of the electrically conductive materials discussed for use in the first transparent conductive layer. However, the second conductive layer need not be transparent. The second conductive layer may be formed in a vacuum environment using materials such as aluminum, tin, silver, platinum, carbon, tungsten, molybdenum, or indium. Oxides of these metals can be used to darken patternable conductive layers. The metal material can be excited by energy from resistance heating, cathodic arc, electron beam, sputtering or magnetron excitation. The second conductive layer may comprise coatings of tin oxide or indium tin oxide, resulting in the layer being transparent. Alternatively, second conductive layer may be printed conductive ink. For higher conductivities, the conductive layer may comprise a silver-based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd).

The LCD may also comprise functional layers, including a conductive layer between the curable layers and the support and any of the layers described above as curable layers. One type of functional layer may be a color contrast layer. The functional layer may comprise a protective layer or a barrier layer. In another embodiment, the polymeric support may further comprise an antistatic layer to manage unwanted charge build up on the sheet or web during roll conveyance or sheet finishing. The functional layer may also comprise a dielectric material. A dielectric layer, for purposes of the present invention, is a layer that is not conductive or blocks the flow of electricity.

In addition to displays, the present invention may be utilized in other applications. For example, another possible application is polymer films with a chiral liquid crystalline phase for optical elements, such as chiral nematic broadband polarizers or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays. Possible display industry applications include ultralight, flexible, and inexpensive displays for notebook and desktop computers, instrument panels, video game machines, videophones, mobile phones, hand-held PCs, PDAs, e-books, camcorders, satellite navigation systems, store and supermarket pricing systems, highway signs, informational displays, smart cards, toys, and other electronic devices. The present invention may also be used in the production of other products, for example, sensors, medical test films, solar cells, fuel cells, to name a few.

EXAMPLES

The following examples are provided to illustrate the invention.

Example 1

Preparation of Styrylpyridine Monomer

The monomers of the invention as represented in Table X were prepared using standard chemical transformations. The preparation of Mnr-1 (Scheme 1), described herein, is exemplary of such methods.

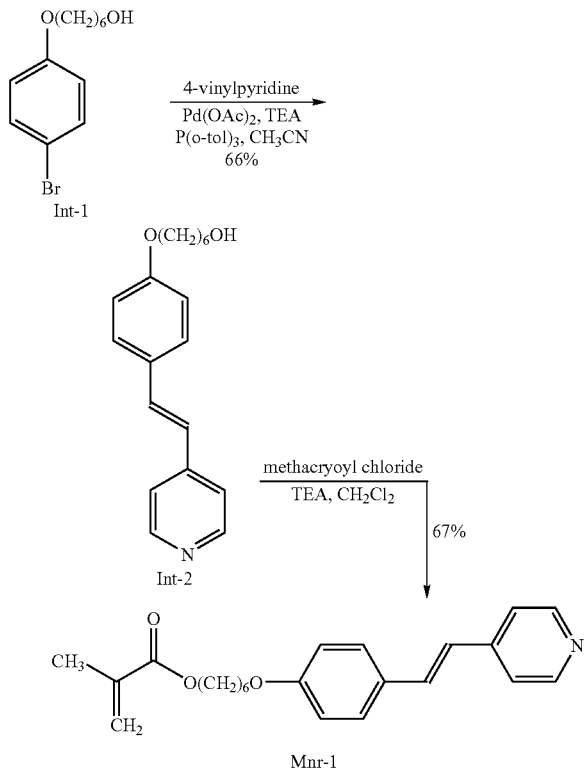

Scheme 1
Preparation of Mnr-1

Preparation on Int-2:
A mixture of Int-1 (CAS No. 133080-87-2; 10.0 g, 36.6 mmol); 4-vinylpyridine (CAS No. 100-43-6; 7.7 g, 73 mmol); triethylamine (CAS No. 121-44-8; 3.7 g, 37 mmol); palladium (II) acetate (CAS No. 3375-31-3; 80 mg, 0.36 mmol); and tri-(o-tolyl)-phosphine (CAS No. 6163-58-2; 0.23 g, 0.76 mmol) in 30 mL acetonitrile were heated at reflux under a nitrogen atmosphere for seventeen hours. The mixture was cooled to ambient temperature and the resultant thick slurry filtered, washing with minimal further acetonitrile. This solid was recrystallized from 150 mL of ethanol (filtration of hot solution through diatomaceous earth) to provide Int-2 as a pale yellow solid in 66.5% yield. This material proved chromatographically homogenous and displayed spectral characteristics consistent with its assigned structure.

Preparation of Mnr-1:
A slurry of Int-2 (7.00 g, 23.6 mmol), and triethylamine (4.0 mL, 29 mmol) in 250 mL dichloromethane was chilled in an ice bath and treated with methacryloyl chloride (CAS No. 920-46-7; 2.4 mL, 2.5 mmol) over two minutes. The mix stirred at reduced temperature for 0.5 hour then allowed to warm to ambient temperature. After 0.75 hour and additional portion of methacryloyl chloride (0.24 mL) was added and stirring continued. After 0.5 hour an additional portion of triethylamine (0.5 mL) was added and stirring continued. After 0.5 hour a final portion of methacryloyl chloride (0.24 mL) was added and stirring continued. After 1.5 hours, the mixture was washed with cold water, dried with sodium sulfate and concentrated in vacuo (heptanes (4×50 mL) flashed off to chase residual solvent). The resultant solid was chromatographed on silica gel, eluting with mixtures of dichloromethane and ethyl acetate, to provide a cream solid. Recrystallization of this solid from isopropyl ether then provided Mnr-1 as a granular cream solid in 67% yield. This material proved chromatographically homogenous and displayed spectral characteristics consistent with its assigned structure.

Example 2

Synthesis of Poly-1

A 70-mL low-actinic glass Schlenck tube was charged with 8.5 g of γ-butyrolactone and 1.5 g of Mnr-1. After the solution had been sparged with Ar for 45 min, 0.015 g of 2,2'-azobisisobutyronitrile (AIBN) was added and the flask was sealed and heated at 60° C. in an oil bath for 47 hr. The reaction solution was precipitated into water, washed, filtered, and dried in vacuo, affording solid yellow Poly-1 in 67% yield. Glass transition temperature (Tg) 51.7° C.; size-exclusion chromatography (PEO-equivalent), Mn 34,400, Mw 126,000.

Example 3

Synthesis of Poly-4

A 70-mL low-actinic glass Schlenck tube was charged with 16.0 g of toluene, 1.91 g of Mnr-1, and 2.09 g of methyl methacrylate (inhibitor removed). After the solution had been sparged with Ar for 45 min, 0.06 g of AIBN was added and the flask was sealed and heated at 60° C. in an oil bath for 47 hr. The reaction solution was filtered through 1 μm PTFE filter medium and precipitated into methanol, washed, filtered, and dried in vacuo, affording a soft, slightly yellow polymer in 98% yield. The polymer was twice dissolved in 1,2-dichloroethane, filtered, and precipitated into cold ethyl ether. Poly-4 had a Tg of 90.8° C., Mn 10,300, and Mw 33,900.

Example 4

Synthesis of Stilbazolium-Containing Poly-3-Me

Figure 2:
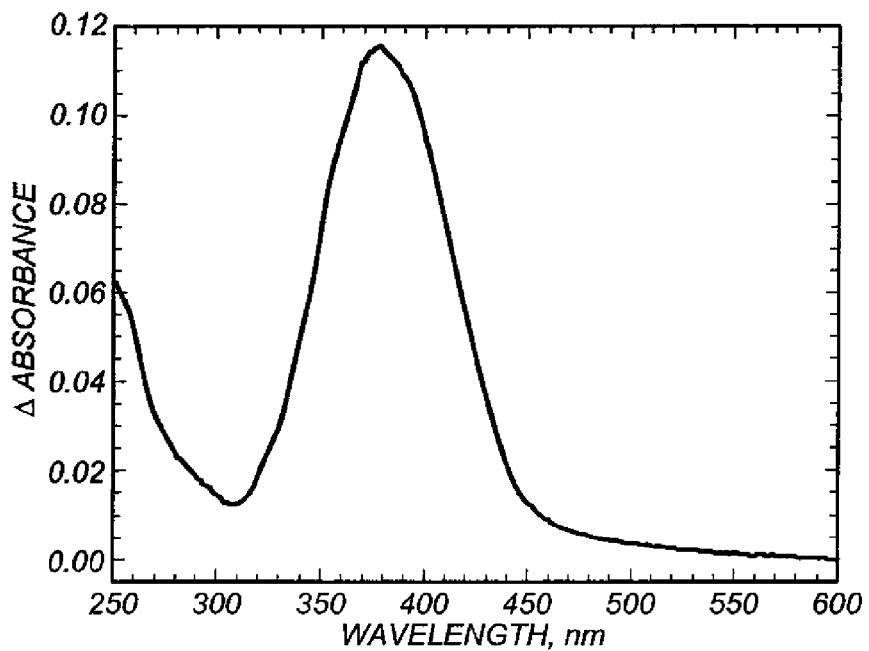
FIG. 2 illustrates the UV-visible absorption spectrum of a solution of Poly-3-Me in acetonitrile showing the appearance of a new band at 376 nm confirming the composition of polymer from Example 4.

Poly-3 (1.96 g) was dissolved in 19.1 mL of N,N-dimethylformamide (DMF) in a 70-mL low-actinic glass Schlenck tube containing a magnetic stirring bar. Dimethyl sulfate (0.60 g) was added slowly to the stirring polymer solution and the resulting reaction mixture was heated at 50° C. in an oil bath for 22 hr. The reaction mixture was cooled, filtered under yellow lights through 1 μm PTFE filter medium and precipitated into cold ethyl ether, affording Poly-3-Me in 98% yield. UV-visible absorption spectrum of a solution of Poly-3-Me in acetonitrile showed band at 376 nm ($\epsilon$=26,000 $M^{-1}$ $cm^{-1}$) (FIG. 2) confirming the composition of polymer.

Example 5

Synthesis of Stilbazolium-Containing Poly-1-H

Figure 3:
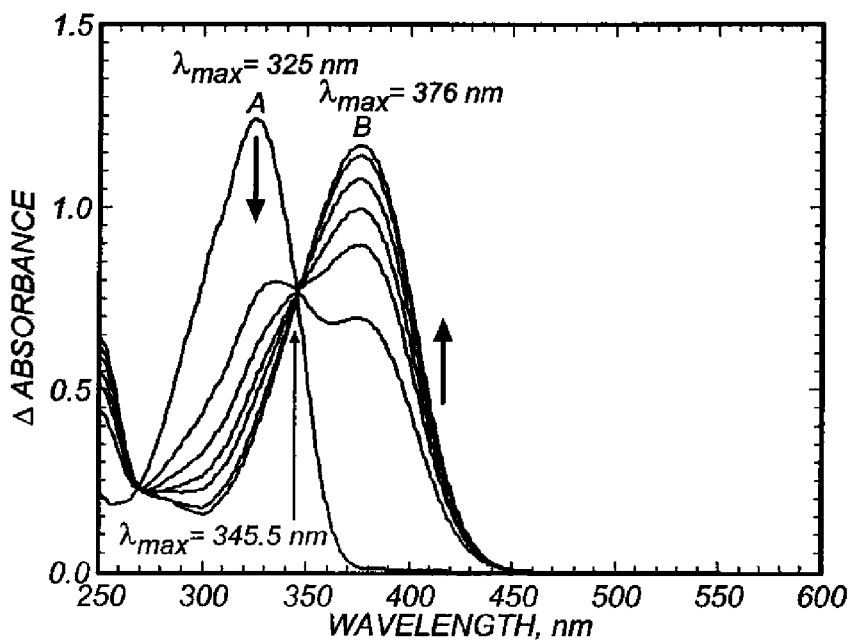
FIG. 3 (Curve A) illustrates the absorption spectrum of Poly-1 dissolved in 1,2-dichloroethane (DCE) showing a large absorption at 325 nm from Example 5.

Poly-1 was dissolved in 1,2-dichloroethane (DCE) to form a 0.5% (w/v) solution and stirred for 5 minutes at room temperature. The absorption spectrum of this solution revealed a large absorption at 325 nm (FIG. 3, Curve A). This absorption was as expected and confirms the composition of the polymer. Incremental amounts of trifluoroacetic acid were added to the DCE solution of Poly-1 and the UV-visible spectrum recorded. The UV-Visible absorption spectrum of the solution upon addition of acid showed the appearance of a new absorption band at 376 nm ($\epsilon$=25,600 $M^{-1}$ $cm^{-1}$) (FIG. 3, Curves B) is similar to the absorption spectrum of Poly-3-Me (FIG. 2) and confirms the formation and composition of the Poly-1-H.

Example 6

Polarized Irradiation of a Thin Film of Poly-3-Me

Figure 4:
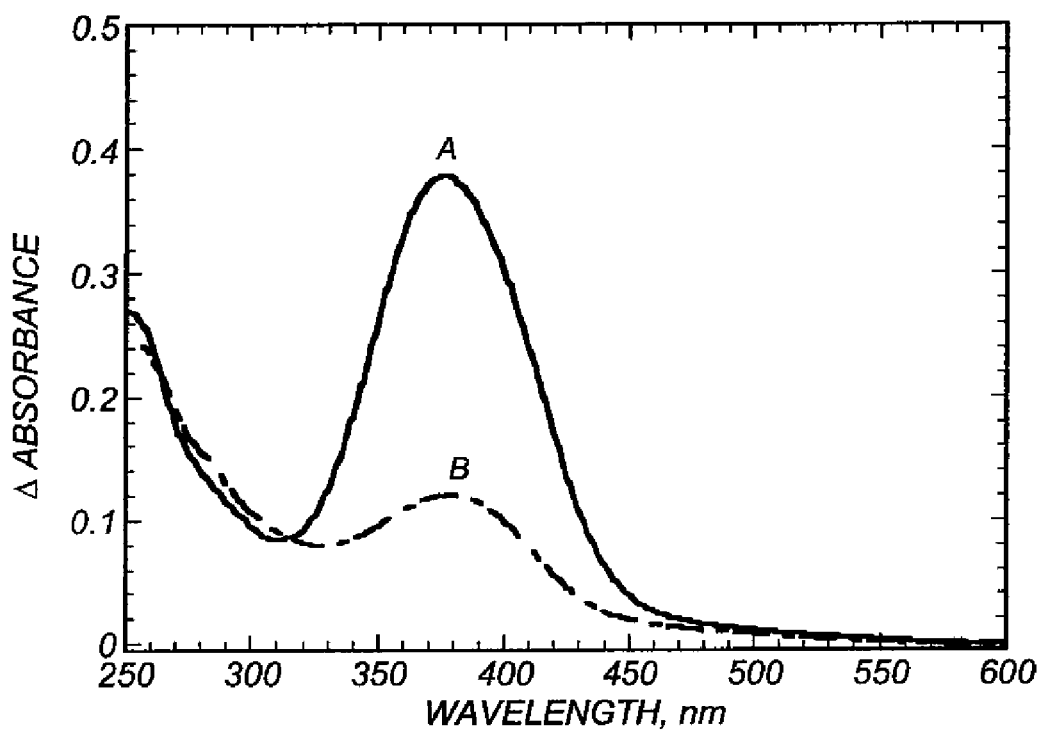
FIG. 4 illustrates that the absorption band of Poly-3-Me before 405 nm irradiation (Curve A), and after (Curve B), resulting in a decrease in intensity (from Example 6).

In order to study the photocrosslinking behavior of Poly-3-Me by UV exposure, absorption spectra of the alignment layer was measured before and after the irradiation with the UV light above 405 nm. A solution of Poly-3-Me in acetonitrile (0.5 wt %) was spin-coated on to a glass plate over the course of one minute at 800 rev/min and layer subsequently dried for 5 minutes on a hot plate at 80° C. The plate was irradiated at 405 nm and photo-reaction followed by UV-visible absorption spectroscopy. Thus, FIG. 4 shows that the absorption band of Poly-3-Me decreases in intensity upon 405 nm irradiation (FIG. 4, Curve A (before), and Curve B (after)) confirming the photo-crosslinking of the polymer layer.

Example 7

Figure 5:
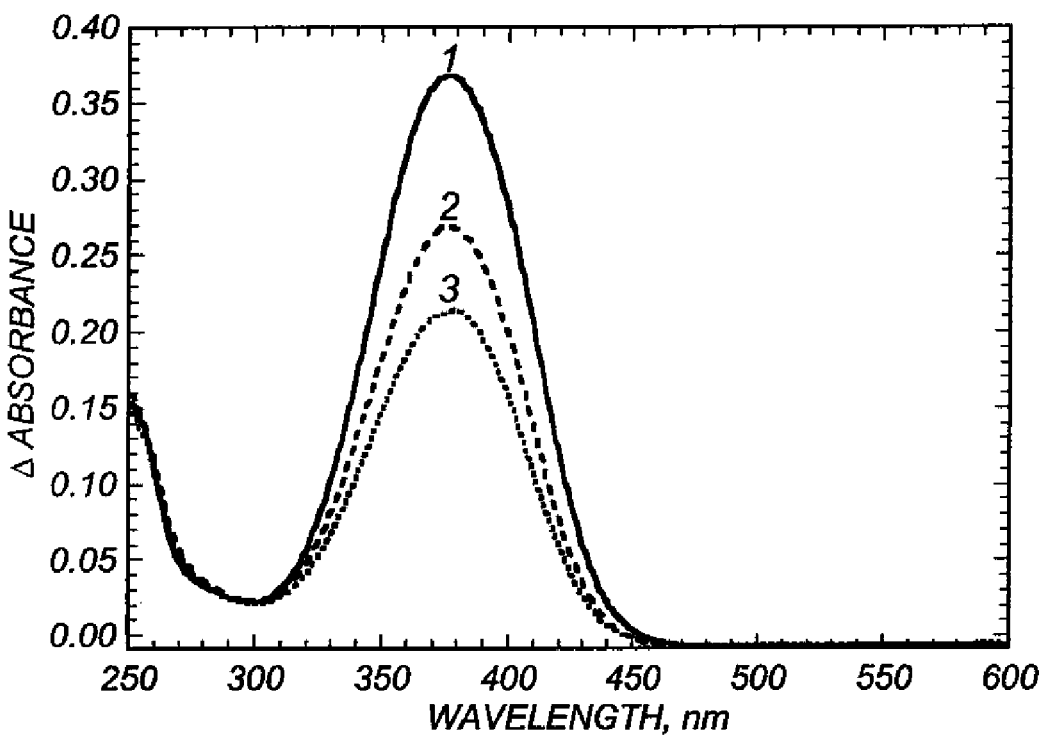
FIG. 5 illustrates the absorption band of Poly-1-H before 405 nm irradiation (Curve 1) and after irradiation (Curve 2 and Curve 3), confirming the photo-crosslinking of the polymer layer from Example 7.

Polarized Irradiation of a Thin Film of Poly-1-H and Quantum Efficiency of Photo-Crosslinking In order to study the photocrosslinking behavior of Poly-1-H by UV exposure, we measured absorption spectra of the alignment layer before and after the irradiation with the UV light at 405 nm. A solution of Poly-1-H in DCE was spin-coated on to a glass plate over the course of one minute at 800 rev/min and the layer subsequently dried for 5 minutes on a hot plate at 80° C. The plate was irradiated at 405 nm and the photo-reaction followed by UV-visible absorption spectroscopy. Thus, FIG. 5 shows that absorption band of Poly-1-H decreases in intensity upon 405 nm irradiation (FIG. 5, Curve 1 (before), and Curve 2 and 3 (after)) confirming the photo-crosslinking of the polymer layer. Based on the bleaching of UV-Vis upon 405 mm irradiation (FIG. 5) a quantum efficiency ($\Phi$) of 0.9 was estimated for the process.

Example 8

(Comparative) PhotoAlignment of Liquid Crystals at 405 nm Using Poly(Vinyl Cinnamate) as Photoalignment Layer Chigrinov et al. in U.S. Pat. No. 5,389,698, incorporated herein by reference, have demonstrated that polarized UV irradiation at 365 nm of poly(vinyl cinnamate) is capable of aligning liquid crystals. This is a comparative example to demonstrate that polarized irradiation of polyvinyl cinnamate at 405 nm does not result in photoalignment of liquid crystal molecules.

A 2% solution of poly(vinyl cinnamate) (mol. wt. Approx. 15,000) in cyclopentanone was spin coated at 800 rpm for 1 minute on to a glass plate and dried in air for 20 minutes and then at 90° C. on a heating plate. A thickness of 60 nm by ellipsometry (J. A. Woollam Co., Model M2000V) was measured for the poly(vinyl cinnamate) layer. The layer was then subjected to linearly polarized irradiation at 405 nm for 2 hours. Subsequent coating of a solution of liquid crystal prepolymer (LCP, CB483MEK from Vantico Co, 7 wt % in methyl ethyl ketone, supplied with photoinitiator) on the irradiated poly(vinyl cinnamate) layer did not result in alignment of liquid crystals. Consequently, the exposure to obliquely incident polarized 405 nm UV-light did not induce an aligning capability in the poly(vinyl cinnamate) layer.

Example 9

PhotoAlignment of Liquid Crystals at 405 nm Using Photopolymer Poly-1-H as Photoalignment Layer This example demonstrates that polarized irradiation of inventive Poly-1-H at 405 nm results in photoalignment of liquid crystal molecules.

A 0.5% solution Poly-1-H in DCE was made and stirred for 5 minutes at room temperature. Solution of Poly-1-H was spin-coated at 800 rpm for 1 minute onto a glass plate substrate and then dried for 10 minutes in an oven at 75° C. All of these operations were performed in an environment of yellow lights. The coated substrate was subsequently exposed to 405 nm polarized light from a 200 W high-pressure mercury lamp at an angle of incidence of 20° to the normal to the substrates, for 1 minute. Ultraviolet cut-off filter GG395 (Schott) and an interference filter were used to isolate 405 nm light. The direction of the polarization of light was in the plane defined by the plate parallel to the incidence direction of irradiation. A thickness of 15 nm by ellipsometry was measured for the crosslinked Poly-1-H layer.

On the photoalignment (orientation) layer a solution of liquid crystal prepolymer (LCP, CB483MEK from Vantico Co, 7 wt % in methyl ethyl ketone, supplied with photoinitiator) in methyl ethyl ketone was spun cast @ 700-1000 rpm. The sample was then heated at a temperature of 55° C. for 3 minutes to orient the nematic liquid crystalline layer and remove solvent. The sample was cooled to room temperature and the anisotropic layer was fixed by exposing to 365 nm light (300-1000 $mJ/cm^2$) under an atmosphere of nitrogen.

In-plane retardation measurement indicated that liquid crystal molecules were aligned parallel to the direction of polarized irradiation. In-plane retardation and thickness of the anisotropic layer were measured by ellipsometry (J. A. Woollam Co., Model M2000V).

A thickness of 250 nm was measured for the crosslinked LCP layer. When the substrate was arranged between crossed polarizers with an angle of 45° between the substrate edges and the transmission axes of the polarizers the substrate looked gray. However, the substrate looked dark when arranging its edges either parallel or perpendicular to the polarizer transmission axes. Consequently, the LCP layer was birefringent with the optical axis aligned either parallel or perpendicular to the longer substrate edge. However, using ellipsometry the optical axis of the LCP layer was found to be parallel to the longer substrate edge, which was arranged parallel to the incidence plane of the UV light during the illumination of the photoaligning material.

Consequently, the exposure to obliquely incident polarized 405 nm UV-light induced an aligning capability in the photoaligning material Poly-1-H which was strong enough to align the liquid crystal monomers of mixture LCP parallel to the incidence plane of the UV light.

Example 10

PhotoAlignment of Liquid Crystals at 405 nm Using Photopolymer Poly-4-H as Photoalignment Layer This example demonstrates that polarized irradiation of inventive Poly-4-H at 405 nm results in photoalignment of liquid crystal molecules.

The Poly-4 was dissolved in 1,2-dichloroethane to form a 0.5% (w/v) solution and stirred for 5 minutes at room temperature. Absorption spectrum of this solution revealed a large absorption at 325 nm. A stoichiometeric amount of trifluoroacetic acid was added to the DCE solution of Poly-4 and the UV-visible spectrum recorded which showed the appearance of a new absorption band at 376 nm confirming formation of Poly-4-H.

The solution of Poly-4-H in DCE was spin-coated at 800 rpm onto a glass plate substrate for 1 minute and then dried for 10 minutes in an oven at 75° C. All of these operations were performed in an environment of yellow light. The coated substrate was subsequently exposed to 405 nm polarized light from a 200 W high-pressure mercury lamp at an angle of incidence of 200 to the normal to the substrates, for 20 seconds. Ultraviolet cut-off filter GG395 (Schott) and an interference filter were used to isolate the desired wavelength of the light. The direction of the polarization of light was in the plane defined by the plate parallel to the incidence direction of irradiation.

A solution of liquid crystal prepolymer (LCP, CB483MEK from Vantico Co, 7 wt % in methyl ethyl ketone, supplied with photoinitiator) was spun cast @ 700-1000 rpm onto the orientation layer. The sample was then heated at a temperature of 55° C. for 3 minutes to orient the nematic liquid crystalline layer and remove solvent. The sample was cooled to room temperature and the anisotropic layer was fixed by exposing to 365 nm light (300-1000 mJ/cm$^2$) under an atmosphere of nitrogen. In-plane retardation measurement indicated that liquid crystal molecules were aligned parallel to the direction of polarized irradiation. In-plane retardation and thickness of the anisotropic layer were measured by ellipsometry (J. A. Woollam Co., Model M2000V).

A thickness of 250 nm was measured for the crosslinked LCP layer. When the substrate was arranged between crossed polarizers with an angle of 45° between the substrate edges and the transmission axes of the polarizers the substrate looked gray. However, the substrate looked dark when arranging its edges either parallel or perpendicular to the polarizer transmission axes. Consequently, the LCP layer was birefringent with the optical axis aligned either parallel or perpendicular to the longer substrate edge. However, using ellipsometry the optical axis of the LCP layer was found to be parallel to the longer substrate edge, which was arranged parallel to the incidence plane of the UV light during the illumination of the photoaligning material.

Consequently, the exposure to obliquely incident polarized UV light at 405 nm induced an aligning capability in the photoaligning material Poly-4-H which was strong enough to align the liquid crystal monomers of mixture LCP parallel to the incidence plane of the UV light.

Example 11

Alignment of Liquid Crystals Using Photopolymer Poly-12-H as Photoalignment Layer Poly-12 was dissolved in methanol to form a 0.5% (w/v) solution and stirred for 5 minutes at room temperature to obtain a cloudy suspension. Methanesulfonic acid was added to this cloudy suspension until a clear solution was obtained. The UV-visible spectrum of the methanol solution after addition of methanesulfonic acid showed the appearance of a new absorption band at 336 nm confirming formation of Poly-12-H.

The solution of Poly-12-H in methanol was spin-coated at 800 rpm onto a glass plate substrate for 1 minute and then dried for 10 minutes in an oven at 65° C. All these operations were performed in an environment of yellow light. The coated substrate was subsequently exposed above 365 nm polarized light from a 200 W high-pressure mercury lamp at an angle of incidence of 200 to the normal to the substrates, for 5 minutes. Ultraviolet edge filter GG395 (Schott) was used to isolate the desired wavelengths of the light. The direction of the polarization of light was in the plane defined by the plate parallel to the incidence direction of irradiation.

On the orientation layer a solution of liquid crystal prepolymer (LCP, CB483MEK from Vantico Co, 7 wt % in methyl ethyl ketone, supplied with photoinitiator) in methyl ethyl ketone was spun cast @ 700-1000 rpm. The sample was then heated at a temperature of 55° C. for 3 minutes to orient the nematic liquid crystalline layer and remove solvent. The sample was cooled to room temperature and the anisotropic layer was fixed by exposing to 365 nm light (300-1000 mJ/cm$^2$) under an atmosphere of nitrogen. In-plane retardation measurement indicated that liquid crystal molecules were aligned parallel to the direction of polarized irradiation. In-plane retardation and thickness of the anisotropic layer were measured by ellipsometry (J. A. Woollam Co., Model M2000V).

A thickness of 250 nm was measured for the crosslinked LCP layer. When the substrate was arranged between crossed polarizers with an angle of 45° between the substrate edges and the transmission axes of the polarizers the substrate looked gray. However, the substrate looked dark when arranging its edges either parallel or perpendicular to the polarizer transmission axes. Consequently, the LCP layer was birefringent with the optical axis aligned either parallel or perpendicular to the longer substrate edge. However, using ellipsometry the optical axis of the LCP layer was found to be parallel to the longer substrate edge, which was arranged parallel to the incidence plane of the UV light during the illumination of the photoaligning material.

Consequently, the exposure to obliquely incident polarized above 365 nm UV-light induced an aligning capability in the photoaligning material Poly-12-H which was strong enough to align the liquid crystal monomers of mixture LCP parallel to the incidence plane of the UV light.

Example 12

Alignment of Liquid Crystals Using an Aqueous Solution Cast Thin Film of Photopolymer Poly-1-H as Photoalignment Layer This example demonstrates preparation and thin film coating of poly-1-H from aqueous solution. Polarized irradiation of such film at 405 nm results in photoalignment of liquid crystal molecules.

Poly-1 was dissolved in a 1:1 mixture of methanol and water to form a 0.5% (w/v) solution and stirred for 5 minutes at room temperature to obtain a cloudy suspension. Hydrochloric acid was added to this cloudy suspension until a clear solution was obtained. The UV-visible spectrum of the methanol solution after addition of hydrochloric acid showed the appearance of a new absorption band at 376 nm confirming formation of Poly-1-H.

The solution of Poly-1-H in 1:1 methanol-water was spin-coated at 800 rpm onto a glass plate substrate for 1 minute and then dried for 10 minutes in an oven at 85° C. All these operations were performed in an environment of yellow light. The coated substrate was subsequently exposed to 405 nm polarized light from a 200 W high-pressure mercury lamp at an angle of incidence of 20° to the normal to the substrates, for 60 seconds. Ultraviolet edge filter GG395 (Schott) and an interference filter was used to isolate the 405 nm wavelength of the light. The direction of the polarization of light was in the plane defined by the plate parallel to the incidence direction of irradiation.

On the orientation layer a solution of liquid crystal prepolymer (LCP, CB483MEK from Vantico Co, 7 wt % in methyl ethyl ketone, supplied with photoinitiator) in methyl ethyl ketone was spun cast @ 700-1000 rpm. The sample was then heated at a temperature of 55° C. for 3 minutes to orient the nematic liquid crystalline layer and remove solvent. The sample was cooled to room temperature and the anisotropic layer was fixed by exposing to 365 nm light (300-1000 mJ/cm$^2$) under an atmosphere of nitrogen. In-plane retardation measurement indicated that liquid crystal molecules were aligned parallel to the direction of polarized irradiation. In-plane retardation and thickness of the anisotropic layer were measured by ellipsometry (J. A. Woollam Co., Model M2000V).

A thickness of 250 nm was measured for the crosslinked LCP layer. When the substrate was arranged between crossed polarizers with an angle of 45° between the substrate edges and the transmission axes of the polarizers the substrate looked gray. However, the substrate looked dark when arranging its edges either parallel or perpendicular to the polarizer transmission axes. Consequently, the LCP layer was birefringent with the optical axis aligned either parallel or perpendicular to the longer substrate edge. However, using ellipsometry the optical axis of the LCP layer was found to be parallel to the longer substrate edge, which was arranged parallel to the incidence plane of the UV light during the illumination of the photoaligning material.

Consequently, the exposure to obliquely incident polarized 405 nm UV-light induced an aligning capability in the photoaligning material Poly-1-H which was strong enough to align the liquid crystal monomers of mixture LCP parallel to the incidence plane of the UV light.

The invention has been described in detail with particular reference to certain preferred embodiments thereof, but it will be understood that variations and modifications can be effected within the spirit and scope of the invention.

The invention claimed is:

1. A display comprises a support bearing at least one conductive layer, an electrically modulated imaging layer comprising a diacrylate or diepoxide with positive birefringence, and an orientation layer, wherein said orientation layer comprises a photoalignable material comprising a photoactive stilbazolium-containing polymer of formula I that demonstrates a quantum efficiency of $\Phi \sim 1$ at wavelengths greater than 365 nm:

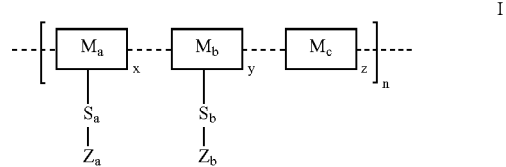

wherein, $M_a$, $M_b$, $M_c$ are monomer units making up said polymer; x and y and z are mole fractions of said monomer units $M_a$, $M_b$, $M_c$, respectively, wherein in each case $0 < x \leq 1$; $0 \leq y < 1$; $0 \leq z < 1$; $S_a$ and $S_b$ are spacer units; $Z_a$ is a stilbazolium unit which can undergo photochemical isomerization/dimerization reactions; $Z_b$ is a stilbazole unit, n is from 4 to 10,000, wherein $Z_a$ has the general formula III-A or III-B:

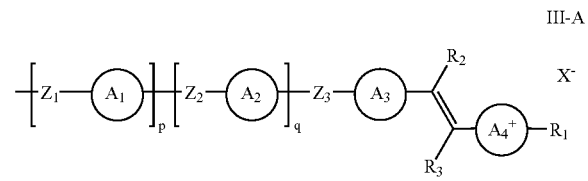

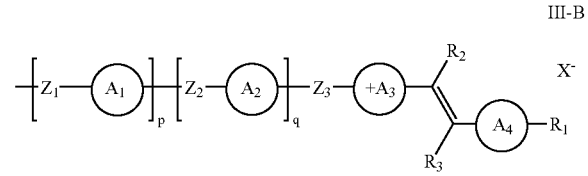

wherein $A_1$ and $A_2$ each individually signify 1,4-phenylene, which is unsubstituted or substituted with halogen, cyano and/or nitro and in which 1 or 2 CH groups are replaced by nitrogen, 2,5-thiophenediyl, 2,5-furanylene, trans-1,4-cyclohexylene, trans-1,3-dioxane-2,5-diyl or 1,4-piperidyl, 1,4- or 2,6-naphthylene, or 4,4'-biphenylene; rings $A_3$ and $A_4$ each individually signify 1,4-phenylene in which 1 or 2 CH groups of either one is replaced by nitrogen; wherein each ring is unsubstituted or substituted with halogen, cyano and/or nitro and in which 1 or 2 CH groups can be replaced by 2,5-thiophenediyl, 2,5-furanylene, 1,4- or 2,6-naphthylene; $Z_1$, $Z_2$ and $Z_3$ each independently signify a single covalent bond, —$CH_2CH_2$—, —O—, —COO—, —OOC—, —NHCO—, —CONH— —$OCH_2$—, —$CH_2O$—, —C≡C—, —$(CH_2)_4$—, —$O(CH_2)_3$—, —$(CH_2)_3O$— or the trans form of —$OCH_2$—CH═CH—, —CH═$CHCH_2O$—, —$(CH_2)_2$—CH═CH— or —CH═$CH(CH_2)_2$—; p and q each independently signify 0 or 1; $R_1$ signifies an electron pair, H or an alkyl group of from 1 to 12 carbon atoms, $R_2$ and $R_3$ each independently signify hydrogen, halogen, cyano, alkyl with 1 to 12 carbon atoms which is optionally substituted with fluorine and in which: optionally 1 or 2 non-adjacent —$CH_2$— groups can be replaced by oxygen, —COO—, —OOC—, —CO— and/or —CH═CH—; X-signifies a charge balancing monovalent anion which may be a separate moiety, such as $Cl^-$, $Br^-$, $I^-$, $PF_6^-$, $BF_4^-$, and $CH3SO_4^-$ or part of $R_1$.

2. The display of claim 1 wherein said photoactive stilbazolium-containing polymer is a homo- or copolymer.

3. The display of claim 1 wherein said photoactive stilbazolium-containing polymer is capable of being oriented and crosslinked by the action of linearly polarized light.

4. The display of claim 1 wherein z=0.

5. The display of claim 1 wherein photoactive stilbazolium-containing polymer of formula I is a homopolymers of Formula II:

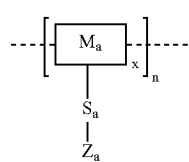

II wherein:
$S_a$ is independently an alkylene chain with 1 to 10, carbon atoms, a cycloalkylene group with 3 to 8 carbon atoms, in which one or two methylene groups can be replaced by NH groups, or phenylene, which can be substituted with lower alkyl, lower alkoxy, —CN, —$NO_2$, halogen, carbonate, an ester group, an aminde group, an ether group or a combination thereof.

6. The display of claim 1 wherein said photoactive stilbazolium-containing polymer of formula I is a homo- or copolymer of the general formula IV:

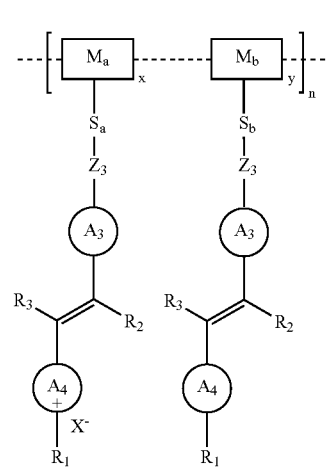

IV wherein,
x is the mole fraction of the of said monomer units $M_a$ in which $A_4^+$ is a pyridyl ring which is quaternized;
y is the mole fraction of said monomer units $M_b$ in which $A_4$ is a pyridyl ring which is unquaternized; and
$0 < x \leq 1$; $0 \leq y < 1$.

7. The display of claim 1 wherein said photoactive stilbazolium-containing polymer of formula I is a compound of the general formula V:

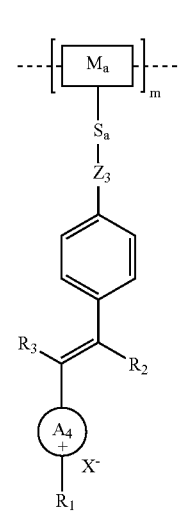

V wherein;
monomer units $M_a$ are units for the formation of copolymers.

8. The display of claim 1 wherein said monomer units $M_a$, $M_b$, $M_c$ comprise is at least one member selected from the group consisting of:

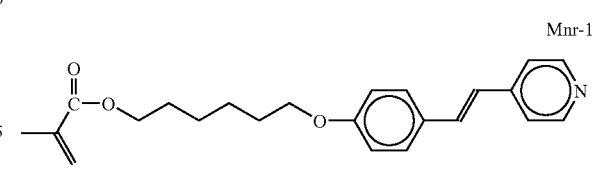

Mnr-1

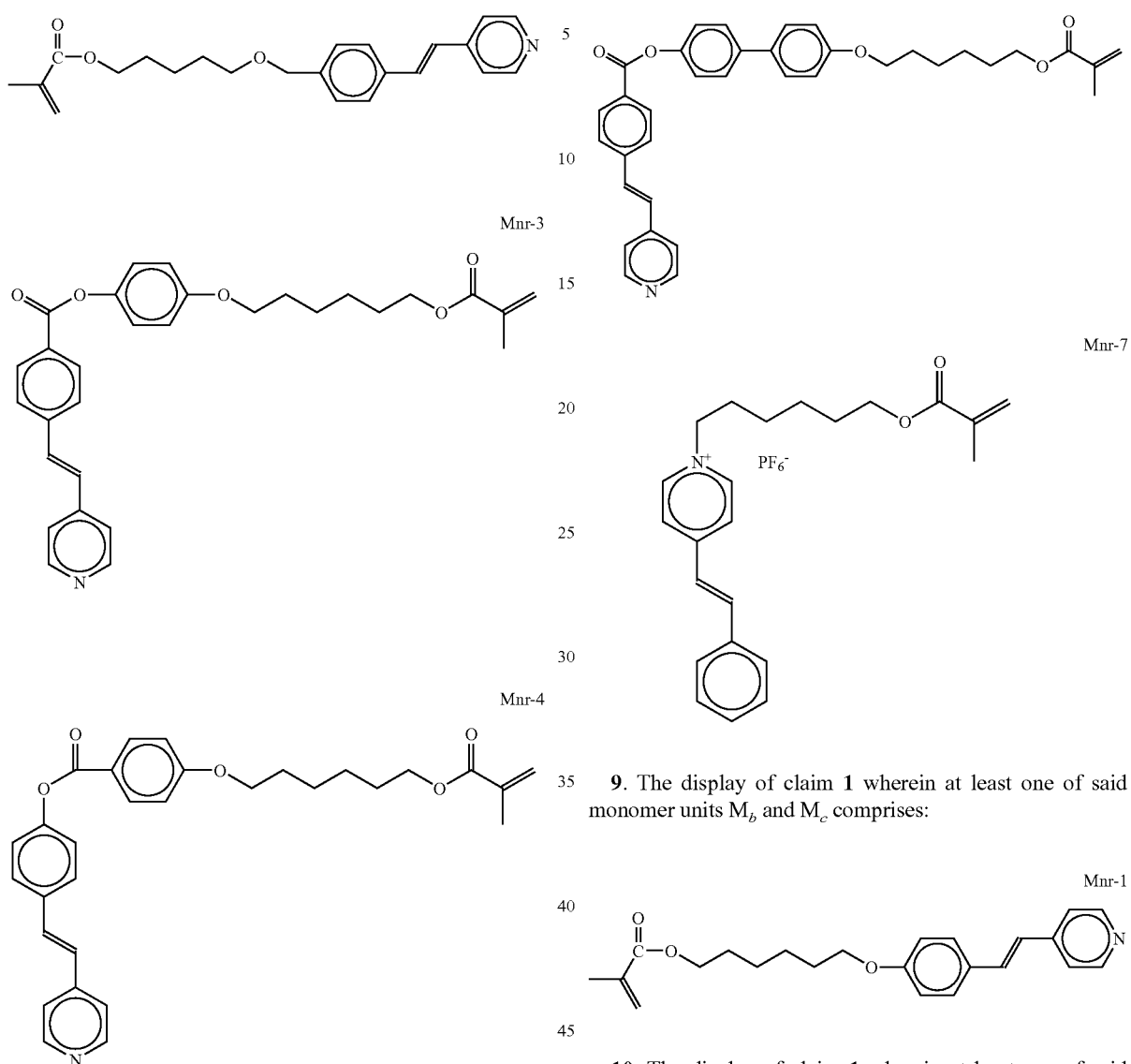
9. The display of claim 1 wherein at least one of said monomer units $M_b$ and $M_c$ comprises:
10. The display of claim 1 wherein at least one of said monomer units $M_b$ and $M_c$ comprises:
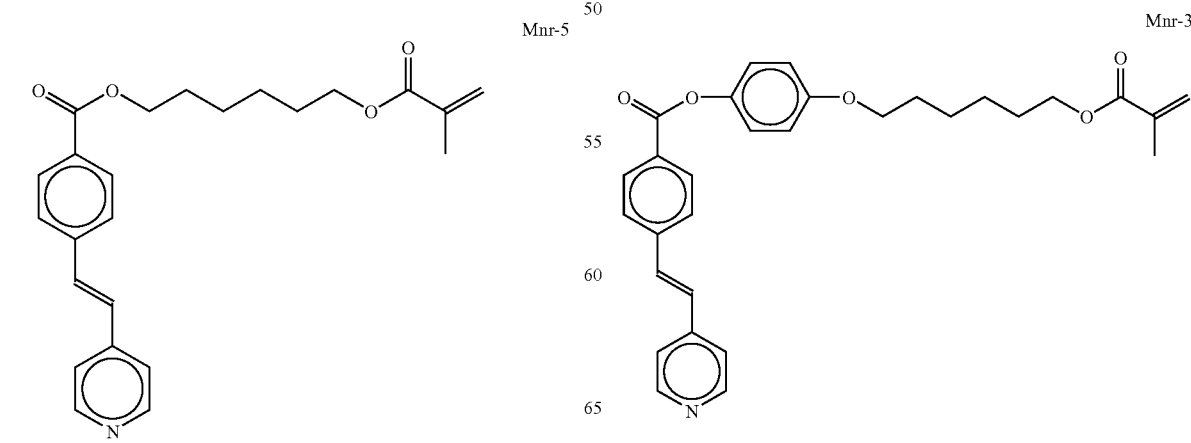

11. The display of claim 1 wherein said photoactive stilbazolium-containing polymer of formula I is derived from at least one member selected from the group consisting of:

| Poly-1 | Mnr-1-100 |
|---|---|
| Poly-2 | Mnr-1-co-methyl methacrylate (5/95) |
| Poly-3 | Mnr-1-co-methyl methacrylate (10/90) |
| Poly-4 | Mnr-1-co-methyl methacrylate (20/80) |
| Poly-5 | Mnr-1-co-benzyl methacrylate (20/80) |
| Poly-6 | Mnr-2-100 |
| Poly-7 | Mnr-2-co-methyl methacrylate (5/95) |
| Poly-8 | Mnr-2-co-methyl methacrylate (10/90) |
| Poly-9 | Mnr-2-co-methyl methacrylate (20/80) |
| Poly-10 | Mnr-3-100 |
| Poly-11 | Mnr-4-100 |
| Poly-12 | Mnr-5-100 |
| Poly-13 | Mnr-6-100 |
| Poly-14 | Mnr-7VII-100 |
| Poly-15 | Mnr-7VII-co-methyl methacrylate (30/70) |

12. The display of claim 1 wherein said photoactive stilbazolium-containing polymer of formula I is derived from:

| Poly-1 | Mnr-1-100 |
|---|---|

13. The display of claim 1 wherein said photoactive stilbazolium-containing polymer of formula I is derived from:

| Poly-10 | Mnr-3-100 |
|---|---|

14. The display of claim 1 wherein said photoactive stilbazolium-containing polymer of formula I is derived from:

| Poly-4 | Mnr-1-co-methyl methacrylate (20/80) |
|---|---|

15. The display of claim 1 wherein said orientation layer has a thickness of less than 25 nanometers.

16. A process for orienting a liquid crystal layer comprising:
(i) coating at least one photoactive stilbazolium-containing polymer of formula I that demonstrates a quantum efficiency of Φ~1 at wavelengths greater than 365 nm:

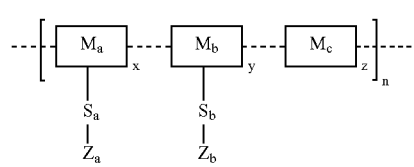

I wherein,
$M_a$, $M_b$, $M_c$ are monomer units making up said polymer; x, y, z are mole fractions of said monomer units $M_a$, $M_b$, $M_c$, respectively, wherein in each case $0<x\leq1$; $0\leq y<1$; $0\leq z<1$; $S_a$ and $S_b$ are spacer units; $Z_a$ is a stilbazolium unit which can undergo photochemical isomerization/dimerization reactions; $Z_b$ is a stilbazole unit, n varies from 4 to 10,000, wherein $Z_a$ has the general formula III-A or III-B:

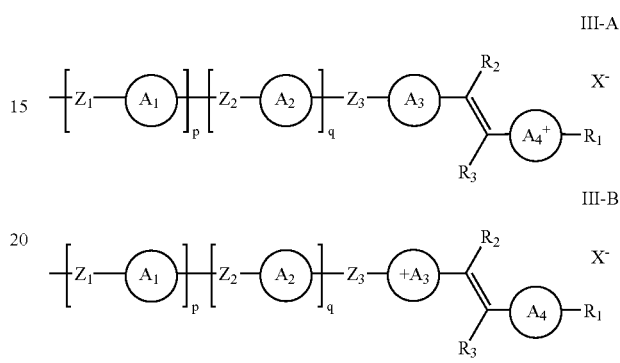

wherein $A_1$ and $A_2$ each individually signify 1,4-phenylene, which is unsubstituted or substituted with halogen, cyano and/or nitro and in which 1 or 2 CH groups are replaced by nitrogen, 2,5-thiophenediyl, 2,5-furanylene, trans-1,4-cyclohexylene, trans-1,3-dioxane-2,5-diyl or 1,4-piperidyl, 1,4- or 2,6-naphthylene, or 4,4'-biphenylene; rings $A_3$ and $A_4$ each individually signify 1,4-phenylene in which 1 or 2 CH groups of either one is replaced by nitrogen, wherein each ring is unsubstituted or substituted with halogen, cyano and/or nitro and in which 1 or 2 CH groups can be replaced by 2,5-thiophenediyl, 2,5-furanylene, 1,4- or 2,6-naphthylene; $Z_1$, $Z_2$ and $Z_3$ each independently signify a single covalent bond, —CH$_2$CH$_2$—, —O—, —COO—, —OOC—, —NHCO—, —CONH— —OCH$_2$—, —CH$_2$O—, —C≡C—, —(CH$_2$)$_4$—, —O(CH$_2$)$_3$—, —(CH$_2$)$_3$O— or the trans form of —OCH$_2$—CH═CH—, —CH═CHCH$_2$O—, —(CH$_2$)$_2$—CH═CH— or —CH═CH(CH$_2$)$_2$—; p and q each independently signify 0 or 1; $R_1$ signifies an electron pair, H or an alkyl group of from 1 to 12 carbon atoms, $R_2$ and $R_3$ each independently signify hydrogen, halogen, cyano, alkyl with 1 to 12 carbon atoms which is optionally substituted with fluorine and in which: optionally 1 or 2 non-adjacent —CH$_2$— groups can be replaced by oxygen, —COO—, —OOC—, —CO— and/or —CH═CH—; X-signifies a charge balancing monovalent anion which may be a separate moiety, such as Cl⁻, Br⁻, I⁻, PF$_6$⁻, BF$_4$⁻, and CH$_3$SO$_4$⁻ or part of $R_1$, in a solvent onto a surface of a substrate to form a layer;
ii) drying said layer;
iii) subjecting said layer to linearly polarized light of wavelength >365 nm to form a photoaligned orientation layer;
iv) coating a polymerizable liquid crystal material comprising a diacrylate or diepoxide with positive birefringence, in a solvent over said photoaligned orientation layer;
v) thermally treating said liquid-crystal material to remove said solvent to form an anisotropic liquid crystal layer; and vi) exposing said liquid crystal material to UV light to cross-link said liquid crystal material.

17. The method of claim 16 wherein said liquid crystal material is a nematic liquid crystal material.

18. The method of claim 16 further comprising
(vii) coating at least one photoactive stilbazolium-containing polymer of formula I in a solvent onto a surface of a substrate to form a second layer;
viii) drying said second layer;
ix) subjecting said second layer to linearly polarized light of wavelength >350 nm to form a second photoaligned orientation layer;
x) coating a second polymerizable liquid crystal material in a solvent over said second photoaligned orientation layer;
xi) thermally treating said second liquid crystal material to remove said solvent to form a second anisotropic liquid crystal layer; and
xii) exposing said second anisotropic liquid crystal layer to UV light to cross-link said second anisotropic liquid crystal layer.

19. A method of photoaligning liquid crystal materials comprising:
i) applying at least one stilbazole polymer in a solvent onto a surface of a substrate to form a coating;
ii) drying said coating to form a layer;
iii) applying a protic acid in a solvent onto said layer to generate a photoactive stilbazolium-containing polymer of formula I that demonstrates a quantum efficiency of Φ~1 at wavelengths greater than 365 nm:

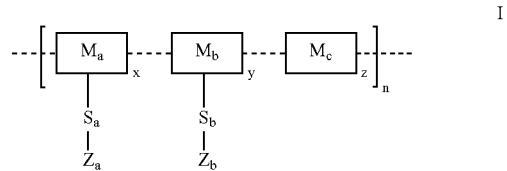

wherein,
$M_a$, $M_b$, $M_c$ are monomer units making up said polymer; x, y, z are mole fractions of said monomer units $M_a$, $M_b$, $M_c$, wherein in each case $0<x\leq1$; $0\leq y<1$; $0\leq z<1$; $S_a$ and $S_b$ are spacer units; $Z_a$ is a stilbazolium unit which can undergo photochemical isomerization/dimerization reactions; $Z_b$ is a stilbazole unit, n varies from 4 to 10,000;
iv) drying; and
v) subjecting said layer to linearly polarized light of wavelength >365 nm to form a photoaligned orientation layer;
iv) coating a crosslinkable liquid crystal material which is a diacrylate or diepoxide with positive birefringence in a solvent on the orientation layer to form a crosslinkable liquid crystal layer;
v) drying said crosslinkable liquid crystal layer to remove said solvent; and
vii) exposing said crosslinkable liquid crystal layer to UV light to crosslink said crosslinkable liquid crystal layer.

20. The method of claim 19 wherein said liquid crystal material is a nematic liquid crystal material.

* * * * *